United States Patent
Albert et al.

(10) Patent No.: US 8,351,409 B2
(45) Date of Patent: Jan. 8, 2013

(54) TIMING SYNCHRONIZATION IN WIRELESS MESH NETWORKS

(75) Inventors: David A. Albert, Columbia, MD (US); John V. Martinez, Roswell, GA (US)

(73) Assignee: Axiometric, LLC, Columbia, MD (US)

( * ) Notice: Subject to any disclaimer, the term of this patent is extended or adjusted under 35 U.S.C. 154(b) by 473 days.

(21) Appl. No.: 12/762,315

(22) Filed: Apr. 17, 2010

(65) Prior Publication Data

US 2010/0202436 A1 Aug. 12, 2010

Related U.S. Application Data

(63) Continuation-in-part of application No. 11/408,053, filed on Apr. 21, 2006, now Pat. No. 8,126,488.

(60) Provisional application No. 60/673,759, filed on Apr. 22, 2005.

(51) Int. Cl.
*H04Q 7/24* (2006.01)

(52) U.S. Cl. .... 370/338; 455/70; 455/456.2; 455/67.14; 455/115.1; 455/181.1; 370/401; 370/444; 370/448; 370/352; 370/412

(58) Field of Classification Search .................. 455/434, 455/181.1; 370/338, 401, 444
See application file for complete search history.

(56) References Cited

U.S. PATENT DOCUMENTS

| | | | |
|---|---|---|---|
| 6,249,516 B1 | 6/2001 | Brownrigg et al. | |
| 6,437,692 B1 | 8/2002 | Petite et al. | |
| 6,791,994 B1 | 9/2004 | Young et al. | |
| 6,836,737 B2 | 12/2004 | Petite et al. | |
| 6,914,893 B2 | 7/2005 | Petite | |
| 7,564,826 B2 * | 7/2009 | Sherman et al. | 370/338 |
| 8,194,636 B1 * | 6/2012 | Doherty et al. | 370/350 |
| 2005/0240520 A1 | 10/2005 | Stura et al. | |
| 2007/0041427 A1 | 2/2007 | Small | |

OTHER PUBLICATIONS

AAA Working Group—Hakala et al., "Diameter Credit Control Application," (Draft—ietf-aaa-diameter-cc-06.txt).

* cited by examiner

*Primary Examiner* — Olumide T Ajibade Akonai
*Assistant Examiner* — Randy Peaches
(74) *Attorney, Agent, or Firm* — Rahman LLC

(57) ABSTRACT

A system for synchronizing time amongst a plurality of wireless network devices in a wireless network is provided, where a message is exchanged between a transmitting wireless device and a receiving wireless device. Such a system includes: a controller that inserts synchronized time information in the message, prior to transmitting the message, the synchronized time information comprising a current time value and a synchronization time value; and a processor that determines a local elapsed time value since last receiving a last synchronized time.

20 Claims, 11 Drawing Sheets

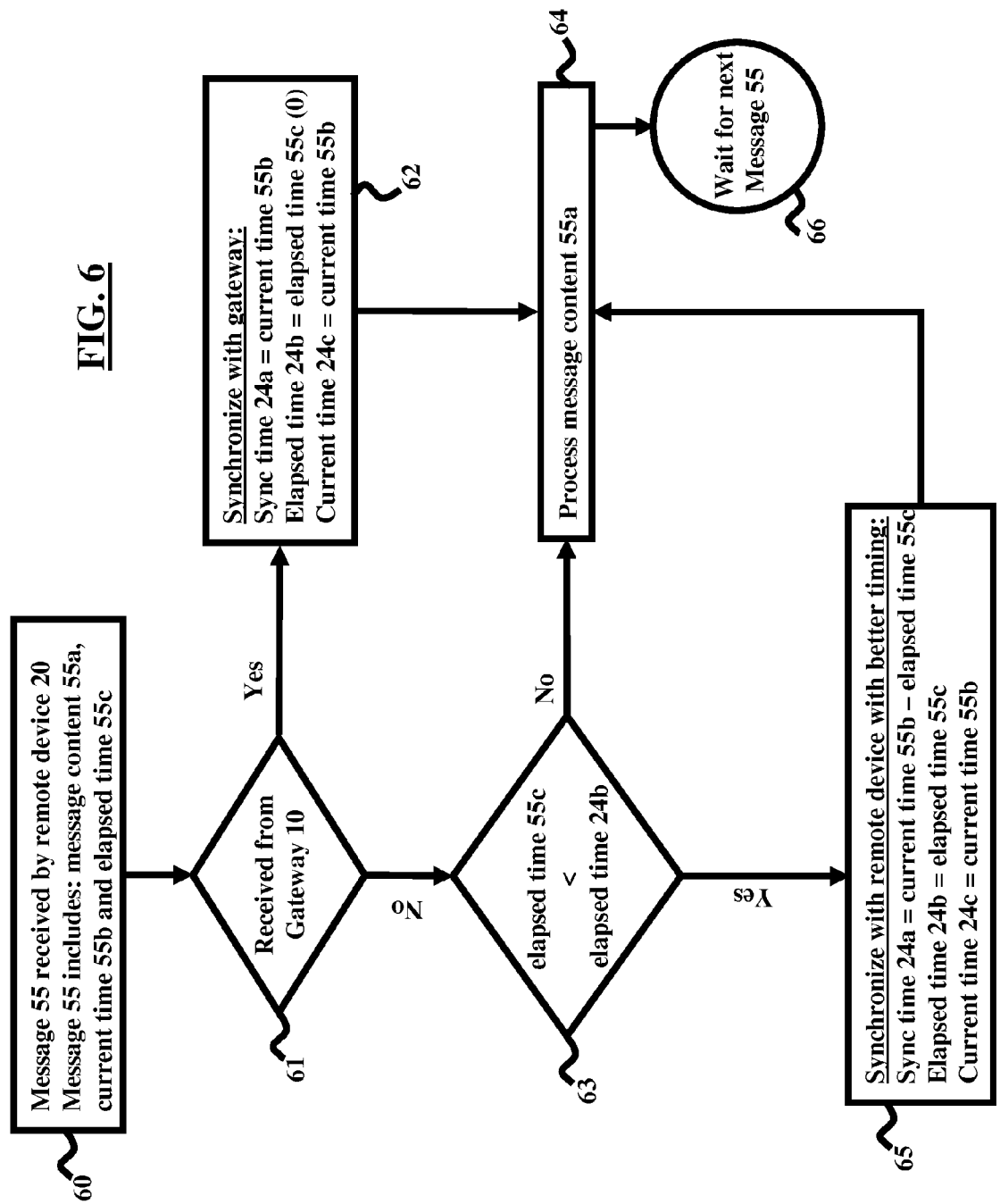

| Msg 70 | Transmitter 71 | Message 55b, 55c 72 | Receiver 74 | Receiver action 75 |
|---|---|---|---|---|
| 55.1 | Gateway device 10 | current time 55b=2:53:02 elapsed time 55c = 0s | Remote device 20 A (24b = max) | sync time 24a = 2:53:02 elapsed time 24b = 0s current time 24c = 2:53:02 |
| 55.2 | Remote device 20 A | current time 55b = 2:53:05 elapsed time 55c = 3s | Remote device 20 B (24b = max) | sync time 24a = 2:53:02 elapsed time 24b = 3s current time 24c = 2:53:05 |
| 55.3 | Remote device 20 B | current time 55b = 2:54:00 elapsed time 55c = 58s | Remote device 20 A (24b = 58s) | elapsed time 55c (58) same as elapsed time 24b (58) so do not synchronize |
| 55.4 | Gateway device 10 | current time 55b = 2:54:05 elapsed time 55c = 0s | Remote device 20 A (24b = 1m 3s) | sync time 24a = 2:54:05 elapsed time 24b = 0s current time 24c = 2:54:05 |
| 55.5 | Remote Device 20 A | current time 55b = 2:54:12 elapsed time 55c = 7s | Remote device 20 B (24b = 1m 10s) | sync time 24a = 2:54:05 elapsed time 24b = 7s current time 24c = 2:54:12 |
| 55.6 | Gateway device 10 | current time 55b = 2:54:16 elapsed time 55c = 0s | Remote device 20 B (24b = 11s) | sync time 24a = 2:54:16 elapsed time 24b = 0s current time 24c = 2:54:16 |
| 55.7 | Remote device 20 A | current time 55b = 2:54:17 elapsed time 55c = 12s | Remote device 20 B (24b = 1s) | elapsed time 55c (12) > elapsed time 24b (1) so do not synchronize |
| 55.8 | Remote Device 20 B | current time 55b = 2:54:18 elapsed time 55c = 2s | Remote device 20 A (24b = 13s) | sync time 24a = 2:54:16 elapsed time 24b = 2s current time 24c = 2:54:18 |

FIG. 7

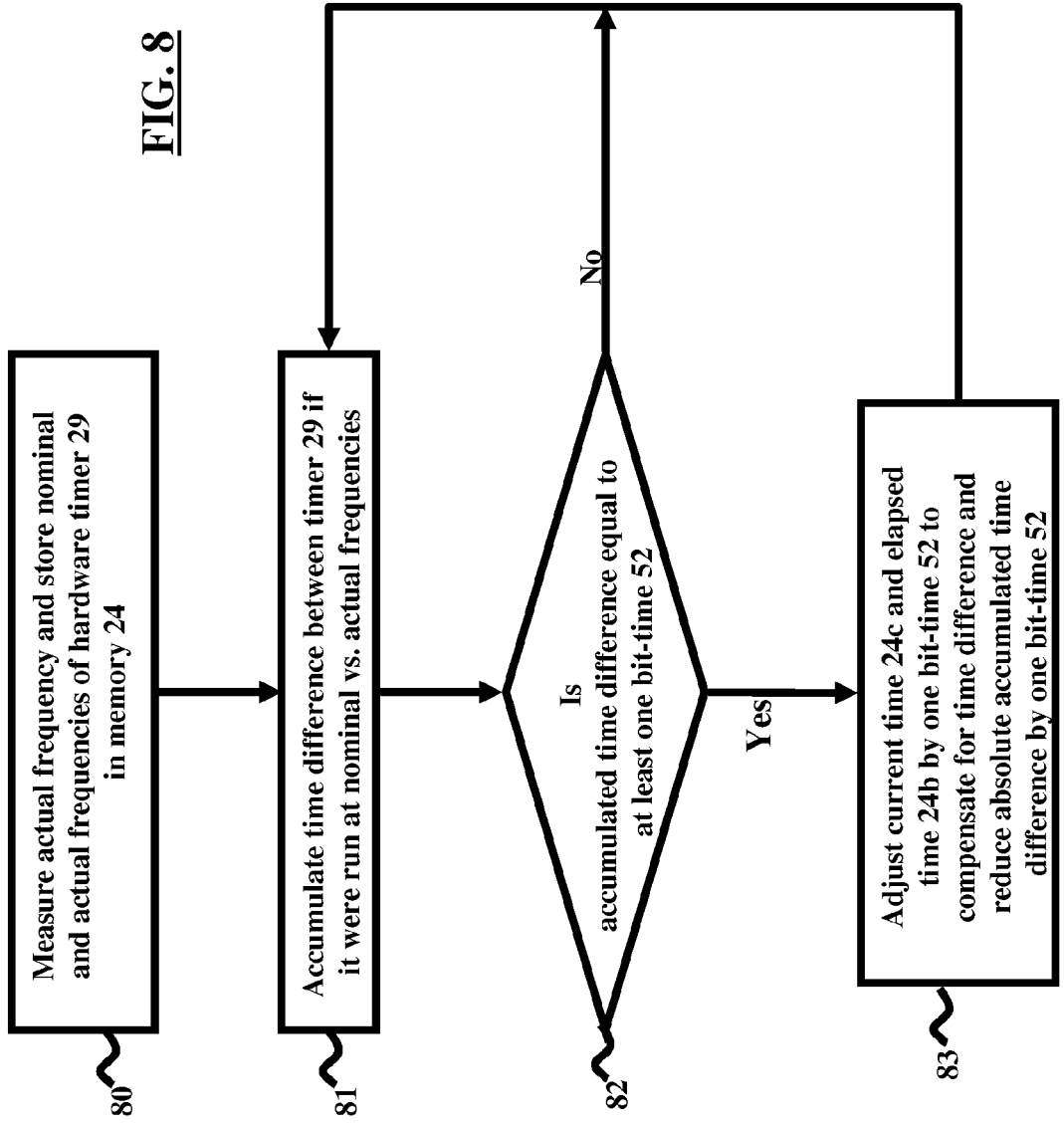

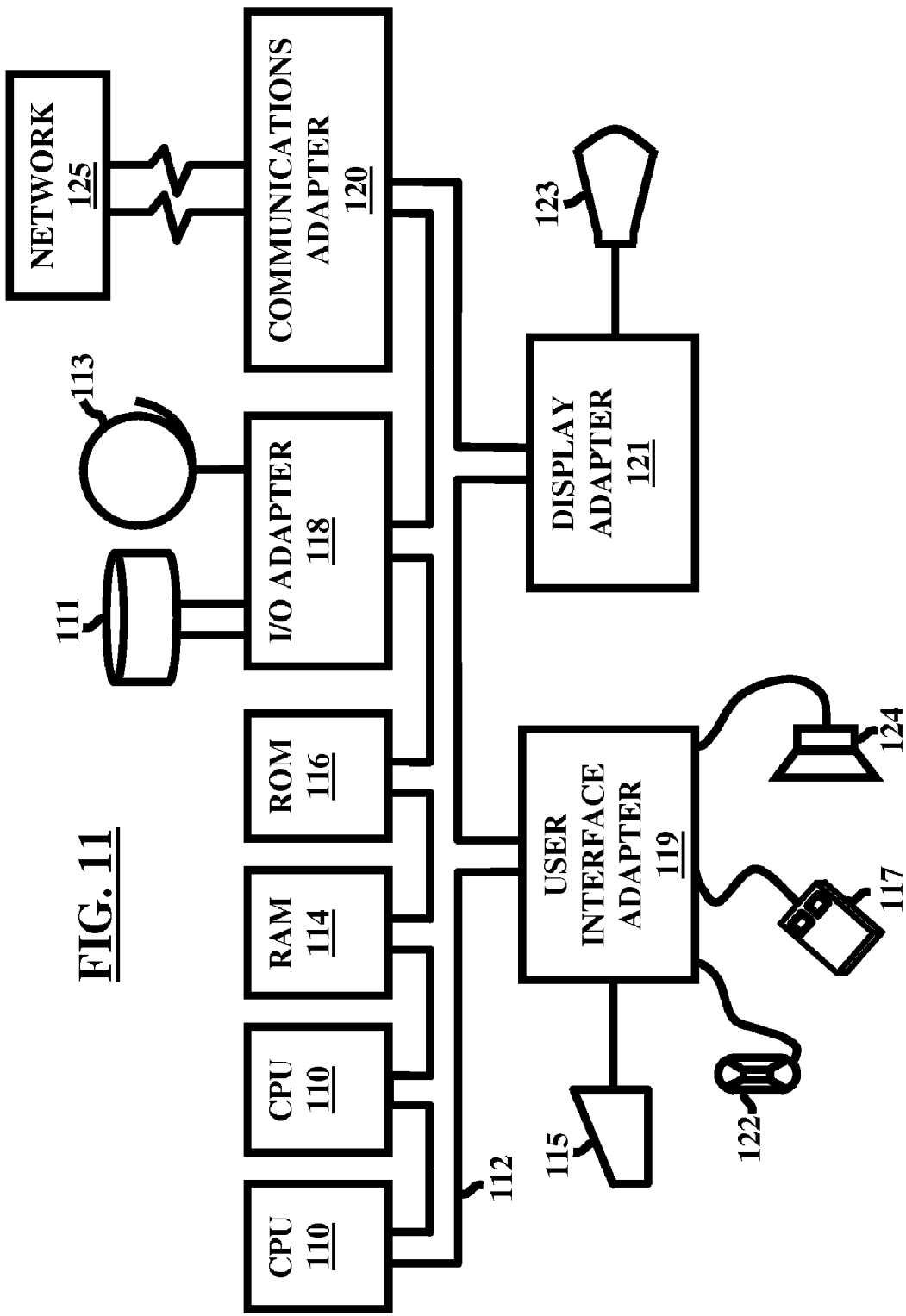

TIMING SYNCHRONIZATION IN WIRELESS MESH NETWORKS

CROSS-REFERENCE TO RELATED APPLICATIONS

This application is a continuation-in-part of U.S. patent application Ser. No. 11/408,053, filed on Apr. 21, 2006, the complete disclosure of which, in its entirety, is herein incorporated by reference, which claims the benefit of U.S. Provisional Application Ser. No. 60/673,759, filed on Apr. 22, 2005, the complete disclosure of which, in its entirety, is herein incorporated by reference.

BACKGROUND

1. Technical Field

The embodiments herein generally relate to wireless communication, and, more particularly, to a highly reliable, fault tolerant, ad-hoc wireless mesh network and related methods of operation.

2. Description of the Related Art

Contemporary wireless communication networks ("networks") typically allow simultaneous communication between several independently operating wireless devices. In order to provide the simultaneous communication, it is important that the devices do not interfere with each other's transmissions and to ensure that devices sending and receiving messages are properly tuned and synchronized with respect to each other. Devices capable of interfering with each other's transmissions are referred to as adjacent devices.

In order for transmissions to be properly sent and received, it is important that no two adjacent devices transmit data over the same communication channel at the same time, an event referred to as a collision. Where two adjacent devices transmit data over the same communication channel at the same time, it typically results in interference, making it difficult for intended recipients of the transmissions to disentangle originally transmitted data.

A common approach used in radio frequency (RF) communication in an effort to ensure that no two adjacent devices transmit over the same communication channel at the same time is to divide the available RF spectrum into fixed quanta called "frequency channels", divide time into fixed quanta called "timeslots" which are aggregated into fixed groups called "frames", and allow transmitters to send data using different frequency channels or different timeslots. An example of this type of communication is frequency hopping spread spectrum communication.

In a wireless network where both the RF spectrum and time are divided up, each separate combination of a particular "frequency channel" and a particular "timeslot" constitutes a unique "communication mode" that does not interfere with other communication modes in the network. Where the available RF spectrum is divided into many frequency channels and time is divided into many timeslots, each device in the network has a large number of non-interfering communication modes that it can use to communicate, thus making it possible for a large number of devices to participate in the network without interference. In addition, since the transmissions of two devices can only cause interference if the two devices are within RF range of one another, the likelihood of interference between devices can be further reduced by manipulating the spacing of the devices and the power level of the transmissions within a network.

FIG. 1 illustrates a wireless communication network including a plurality of wireless devices "A" through "R". Devices that are within RF range of each other (referred to as "adjacent devices") have a line drawn between them. For example, devices "A", "B", and "C" are within RF range of each other. Hence, in order to ensure that transmissions involving devices "A", "B", or "C" are properly sent and received, no two of these devices may transmit on the same frequency channel during the same timeslot. In addition, in order for device "A" to successfully transmit data to devices "B" and "C" using a particular frequency channel and a particular timeslot, devices "B" and "C" must tune their receivers to the particular frequency channel during the particular timeslot in order to receive the message.

FIG. 2 illustrates an exemplary set of communication modes for a wireless network configuration. In FIG. 2, time is divided into sequential frames comprising 24 timeslots each, and the available RF spectrum is divided into 50 frequency channels. The beginning of a frame (timeslot 1) will be referred to as a "frame time" or a "synchronized time reference". Each box in the grid shown in FIG. 2 represents one communication mode. For a particular frame of time, the number of available communication modes is the number of timeslots multiplied by the number of frequency channels, or in this case, 50*24=1200 modes.

Although dividing time and available RF bandwidth helps limit the amount of interference in a wireless network, it creates a complication for the devices of figuring out which frequency channels and timeslots the other devices are using. In order for a communication to succeed, a device transmitting data and a device receiving the transmitted data must both use the same timeslot and frequency channel. Since wireless networks often involve a large number of frequency channels and timeslots, the likelihood that a particular pair of devices will use the same frequency channel/timeslot combination by chance alone is very slim. As a result, it is necessary for devices to coordinate their communications in some structured way. For example: networks that use timeslot assignment require mechanisms to synchronize the timing of adjacent transmitters and receivers to ensure successful communication.

SUMMARY

In view of the foregoing, an embodiment herein provides a system of coordinating communication across a wireless network comprising a plurality of electronic devices operatively connected to the wireless network, each electronic device of the plurality of electronic devices comprising a wireless transceiver transmitting and receiving messages; a central processing unit coupled and operatively in communication with the wireless transceiver; a memory unit coupled and operatively in communication with the central processing unit; and a timer coupled and operatively in communication with the central processing unit, the timer comprising an oscillator measuring an amount of elapsed time; where a first electronic device of the electronic devices periodically transmits a master timing message comprising a current time as measured and maintained by a first timer, and upon receiving the master timing message, a second electronic device of the electronic devices stores the received current time as synchronization time in a second memory unit and synchronizes a second timer with the received current time, where the second electronic device transmits a synchronized timing message comprising the stored synchronization time, and a second current time, as determined by the second timer, and upon receiving the synchronized timing message, a third electronic device of the electronic devices compares the received synchronization time with a third synchronization time stored in a third memory unit and replaces the stored third synchronization time with the received synchronization time and synchronizes a third timer with the received current time only when the received synchronization time is newer than the stored third synchronization time.

Such a system may further comprise a fourth electronic device of the plurality of electronic devices, that upon receiving a first message comprising at least one of a synchronized timing message containing a newer synchronization time and a master timing message, and subsequently receiving a second message comprising at least one of a synchronized timing message comprising a newer synchronization time and a master timing message, the fourth electronic device may calculate an elapsed time as being the time elapsed between receiving the first message and the second message, where the fourth electronic device may calculate a timing error as being a difference between the current time in the received second message and the current time as maintained by a fourth timer prior to synchronization with the current time in the second message, and the fourth electronic device may calculate a timer drift rate as being a ratio of the timing error divided by the elapsed time and stores the drift rate in a fourth memory unit, and where the fourth electronic device may periodically adjust the fourth timer by advancing or retracting the fourth timer by an amount equal to the stored drift rate multiplied by the time elapsed since the fourth timer was last adjusted or synchronized. Moreover, the fourth electronic device may store a drift rate threshold and a lock switch in the memory unit and when the calculated drift rate is less than the drift rate threshold, the fourth electronic device may set the lock switch in the memory unit and applies the calculated drift rate towards adjustment of the fourth timer, otherwise when the calculated drift rate is at least as great as the drift rate threshold, the fourth electronic device may reset the lock switch in the memory unit and applies a fraction of the calculated drift rate to the adjustment of the fourth timer.

In addition, such a system may further include a fifth electronic device of the plurality of electronic devices further that comprises: an accuracy timer coupled and operatively in communication with the central processing unit, the accuracy timer comprising an accuracy oscillator measuring an accuracy elapsed time. Moreover, the fifth electronic device may calculate a drift rate of a fifth timer relative to the accuracy timer and stores the drift rate as an estimated drift rate in a fifth memory unit. In addition, the fifth electronic device may periodically advance or retard the fifth timer to compensate for the drift rate stored in the fifth memory unit. Furthermore, the fifth electronic device of the electronic devices may further comprise a temperature sensor coupled and operatively in communication with the central processing unit, the temperature sensor measuring an ambient temperature, and the fifth electronic device may periodically retrieve a temperature drift rate, corresponding to the ambient temperature as measured by the temperature sensor, from a drift rate table stored in a fifth memory unit and advances or retards the timer by the temperature drift rate. Additionally, the drift rate table may comprise initial values and the initial values may be calculated using at least one of a heuristic value, the ambient temperature measurement, and a difference between a first frequency and a second frequency, and the heuristic value may comprise a predetermined drift rate calculation of the timer at the ambient temperature measurement. In addition, the temperature drift rate stored in the memory may periodically updated by replacing an existing value with a new value calculated as a function of the stored temperature drift rate and the calculated timer drift rate.

In such a system, the second electronic device may also include: an auxiliary oscillator, where when the adjusted drift rate of the second device synchronized hardware timer may be determined to be less than a drift tolerance of the auxiliary oscillator, a measured frequency of the auxiliary oscillator is measured by comparing the frequency of the auxiliary oscillator with the second device synchronized hardware timer, and any difference between a nominal and the measured frequency of the auxiliary oscillator may be corrected by adjusting or retracting the auxiliary oscillator by an appropriate amount as to compensate for the measured difference. In addition, the auxiliary oscillator comprises a radio frequency oscillator and the radio frequency oscillator generates a radio frequency signal.

Another embodiment herein provides a system for synchronizing time amongst a plurality of wireless network devices in a wireless network where a message is exchanged between a transmitting wireless device and a receiving wireless device, the system comprising: a controller that inserts synchronized time information in the message, prior to transmitting the message, the synchronized time information comprising a current time value and a synchronization time value; and a processor that determines a local elapsed time value since last receiving a last synchronized time.

Such a system may further comprise a gateway device comprising: a gateway receiver; a gateway transmitter that transmits the message that includes gateway time synchronization information; a gateway hardware timer comprising an oscillator; a gateway central processing unit coupled and operatively in communication with the gateway receiver, the gateway transmitter, and the gateway hardware timer; and a gateway memory unit coupled and operatively in communication with the gateway central processing unit, the gateway memory unit comprising a drift rate table; at least one remote device comprising: a remote receiver that receives time synchronization information that includes a current time value and a synchronization time value; a remote transmitter that transmits time synchronization information; a remote hardware timer comprising an oscillator; a remote micro-controller coupled and operatively in communication with the remote receiver, the remote transmitter, and the remote hardware timer; and a remote memory unit coupled and operatively in communication with the remote micro-controller, and the remote memory unit may comprise: a current time value; a synchronization time value; and a drift rate value. In addition, the remote device may update the remote hardware timer with the received current time and may replace the stored synchronization time with the received synchronization time when the received synchronization time is newer than the stored synchronization time value. Moreover, the remote device may further comprise a memory manager that stores a difference between a nominal frequency value and a measured actual frequency value of the remote hardware timer, and the remote micro-controller of the remote device may accumulate the difference between the nominal frequency value and the actual frequency value for a cycle of the remote hardware timer and may compare the accumulated difference until the accumulated difference exceeds an approximated time of transmitting one bit of information, where: when the accumulated difference is as least as great as the approximated time of transmitting one bit of information, adjusting the remote hardware timer to compensate for the difference; otherwise, waiting until next cycle of the remote hardware timer.

In such a system, the remote device may also comprise a temperature sensor measuring an ambient, and the remote device may periodically retrieve a temperature drift rate, corresponding to the ambient temperature measured by the temperature sensor, from a drift rate table stored in the remote memory unit and advances or retards the timer according to the temperature drift rate. In addition, a second electronic device of the at least one remote device may synchronize a second timer with the current time received in the master timing message and may subsequently transmit a synchronized timing message containing a second device current time as measured and maintained by the remote hardware timer, where, upon receiving the synchronized timing message with a newer synchronization time or receiving the master timing message, a third electronic device of the at least one remote device calculates a timing error as being a difference between the received current time and the current time maintained by third electronic device remote hardware timer, the third electronic device may calculate a drift rate as a ratio of the timing error divided by an elapsed time that has elapsed since the third electronic device remote hardware timer was last synchronized according to the synchronized timing message, and the third electronic device periodically may adjust the third electronic device remote hardware timer by advancing or retracting the third electronic device remote hardware timer by an amount equal to the drift rate multiplied by the elapsed time since the last adjustment.

Additionally, in such a system, the drift rate table may comprise initial values and the initial values are calculated using at least one of a heuristic value, the ambient temperature measurement, and a difference between a first frequency and a second frequency, and where the heuristic value may comprise a predetermined drift rate calculation of the timer at the ambient temperature measurement. Moreover, the temperature drift rate stored in the remote memory unit may be periodically updated by replacing the initialized value with a new value calculated as a function of the temperature drift rate and a timer drift rate. In addition, such a system may further comprise a radio frequency (RF) oscillator, where the radio frequency oscillator may generate a radio frequency signal, an adjusted drift rate of a synchronized hardware timer may be determined to be less than a drift tolerance of the RF oscillator, a measured frequency of the RF oscillator may be measured by comparing the frequency of the RF oscillator with the synchronized hardware timer, and any difference between a nominal and the measured frequency of the RF oscillator may be corrected by adjusting or retracting the RF oscillator by an appropriate amount as to compensate for the measured difference.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6 is a flow diagram illustrating a method of synchronizing the timing of network devices in a wireless mesh network, according to embodiments described herein;

FIG. 7 is a table of example transmissions from the method described in FIG. 6, according to embodiments described herein;

FIG. 8 is a flow diagram of one example method of compensating for manufacturer and manufacturing process variations in oscillators, according to embodiments described herein;

FIG. 11 illustrates a schematic diagram of a computer architecture used in accordance with the embodiments herein.

DETAILED DESCRIPTION OF PREFERRED EMBODIMENTS

Figure 1:
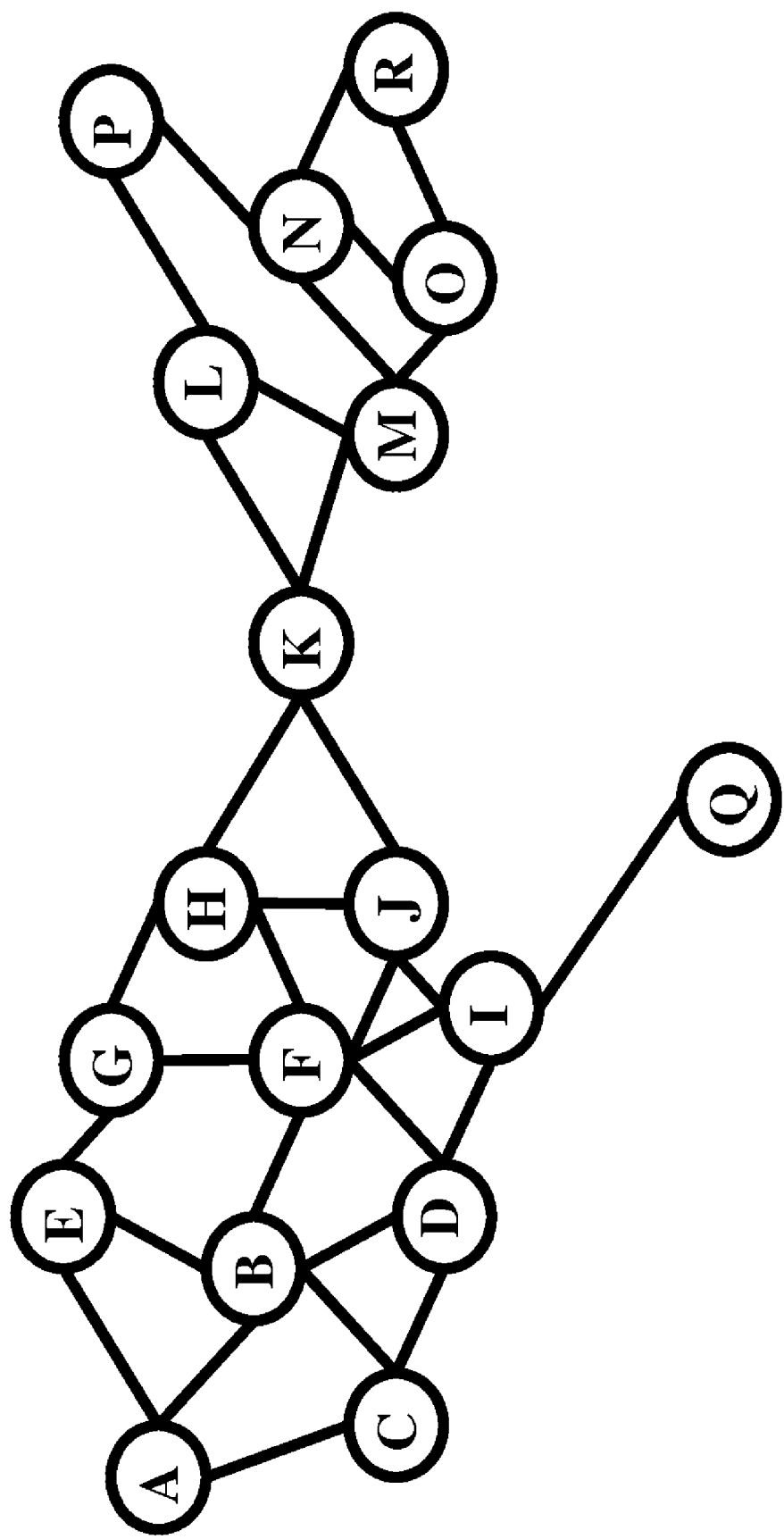
FIG. 1 is a diagram illustrating a structure for a wireless communication network.
Figure 2:
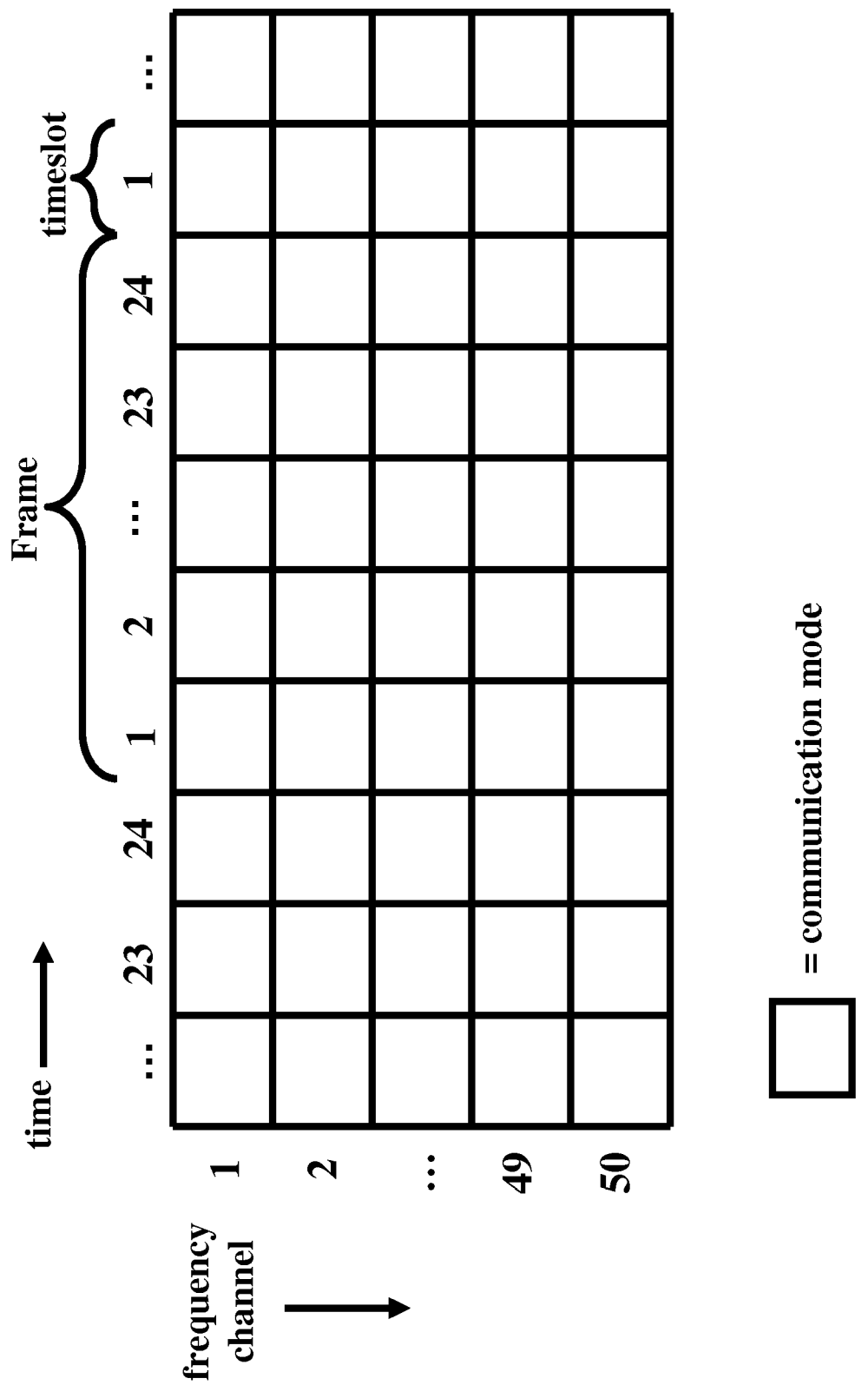
FIG. 2 is a diagram illustrating communication modes for an exemplary configuration of a wireless network.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method and system for wireless mesh network communications. As described below, wireless mesh networks may be used to collect data from a plurality of remote sensing devices and may also be used to manage and control remote devices. Embodiments described herein may include networks structured as "trees" with a gateway device (or "root" device) that serves as the controller for a wireless mesh network and a plurality of remote devices (operating as branches or "leaves"). In addition, the gateway device may also serve as a bridge between the wireless mesh network and another network such as a traditional TCP/IP wired or wireless network, as described in further detail below. The embodiments herein also provide a method and system of synchronizing the communication timing and frequency between devices connected to a wireless communication network and enable devices in the wireless communication network to operate over extended temperatures and long periods of inactivity while maintaining the synchronization required for communications using Time-Division-Multiple-Access (TDMA) and Frequency-Division-Multiplexing (FDM). Specifically, the embodiments herein provide a method and system for synchronizing the timing and frequency of a plurality of remote wireless communication devices with a master time source using wireless communications and also provide methods and a system for maintaining said synchronization during the periods between wireless communications. Referring now to the drawings, and more particularly to FIGS. 3 through 11, where similar reference characters denote corresponding features consistently throughout the figures, there are shown preferred embodiments.

Figure 3:
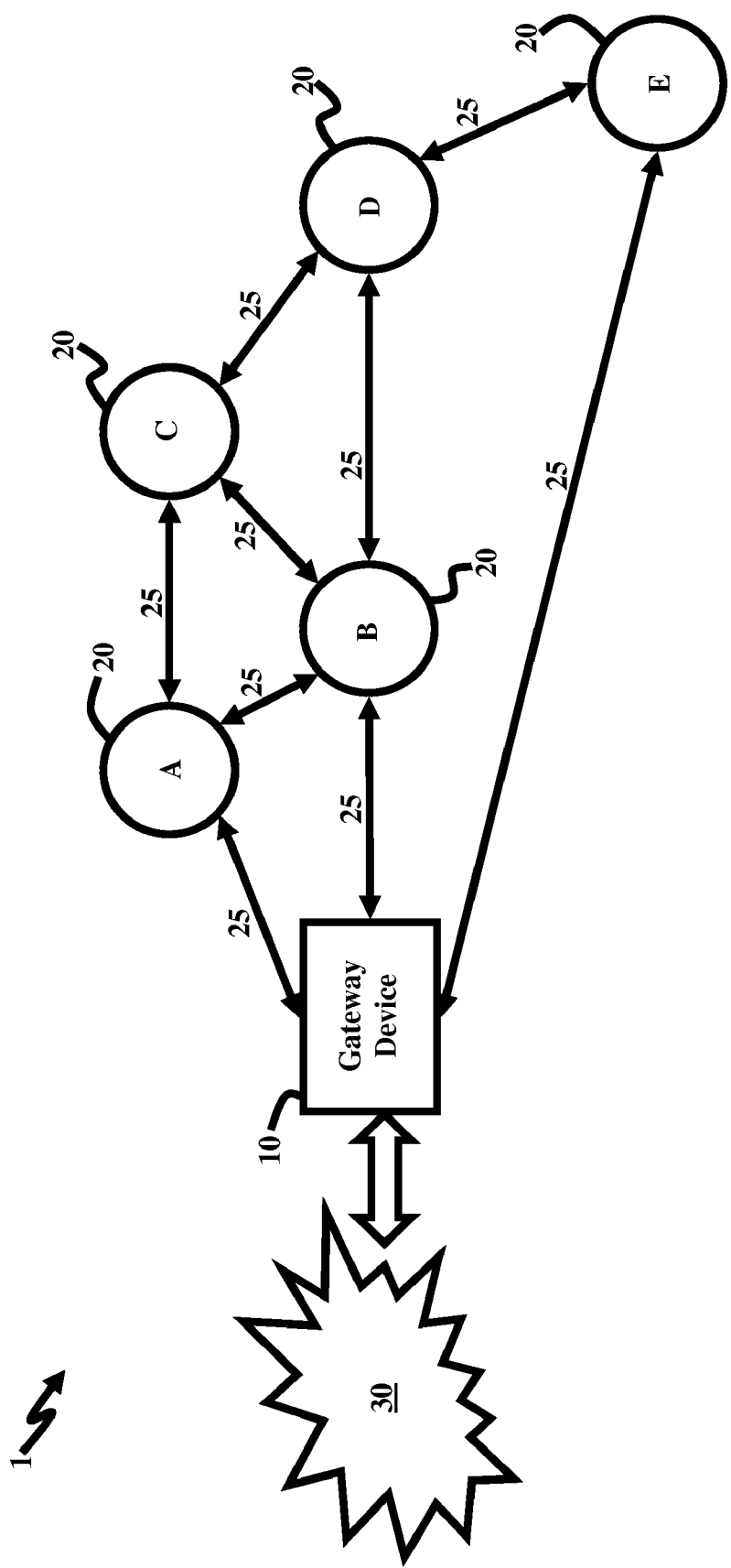
FIG. 3 illustrates schematic diagram of a wireless network, according to embodiments described herein.

Illustrated in FIG. 3 is wireless mesh network 1, which includes gateway device 10 and a plurality of remote devices 20 (A-E) that communicate with each other and with gateway device 10 using wireless communication links 25 (e.g., through RF channels). Wireless mesh network 1 may include a low-cost, low-power, wireless mesh networking standard; e.g., a mesh network based on the IEEE 802.15.4-2003 standard (also known as a Zigbee network). The IEEE 802.15.4-2003 standard is a publication of the Institute of Electrical and Electronic Engineers, Inc. and is incorporated, in its entirety, herein by reference. In addition, gateway device 10 may connect remote devices 20 with external network 30.

In the embodiments described below, wireless mesh network 1 uses TDMA and FDM to allow gateway device 10 and remote devices 20 to share a common data transmission medium (e.g., the radio spectrum), as further described in U.S. patent application Ser. No. 11/408,053, the complete disclosure of which, in its entirety, is herein incorporated by reference. Using TDMA and FDM methods described in U.S. patent application Ser. No. 11/408,053, each remote device 20 utilizes specific time periods and frequency channels to send and/or receive messages.

Figure 4:
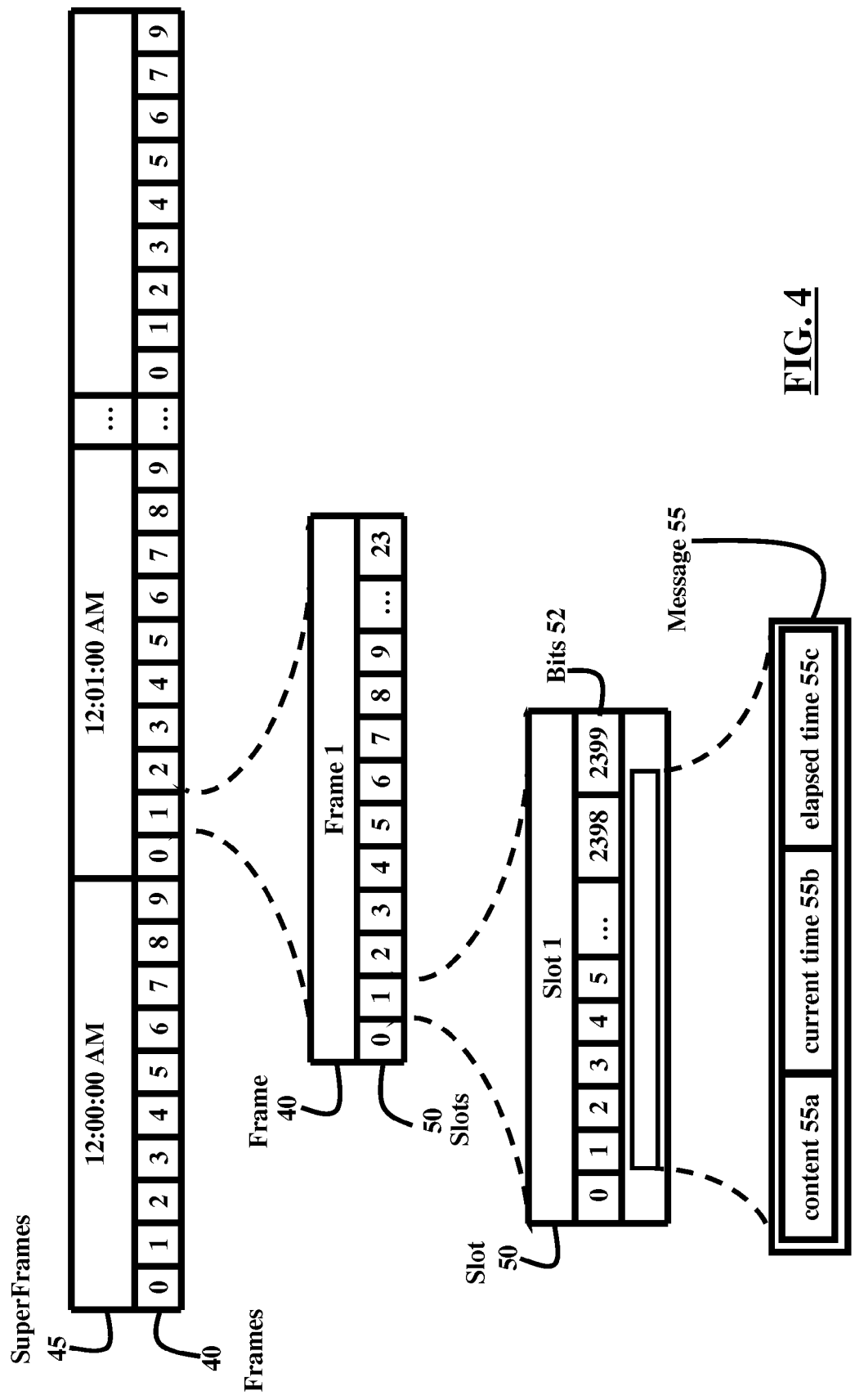
FIG. 4 illustrates a schematic diagram of an exemplary method for dividing communications via Time-Division-Multiple-Access, according to embodiments described herein and also illustrates an exemplary communication message.

FIG. 4, with reference to FIG. 3, illustrates a schematic diagram of an example TDMA division that allows a common data transmission medium to be used by remote devices 20. For example, as shown in FIG. 4, TDMA may divide each minute of time into frames 40, where each frame 40 is 6 seconds. In addition, a group of ten frames 40 constitutes a super-frame 45. Thus, as shown in FIG. 4, there are 10 frames 40 and one super-frame 45, for every minute of time. In addition, each frame 40 may be divided into 24 slots 50, where each slot 50 is a ¼ second time period. Moreover, each slot 50 in a frame may contain a certain number of binary digits (or "bits", e.g., 0 or 1) that may be transmitted. The number of bits capable of being transmitted in each slot 50 depends on the data transmission rate for wireless communication links 25 (of FIG. 3). Moreover, each bit within slot 50 is transmitted in bit-time 52, where bit-time 52 is a specific amount of time to transmit one bit of data across communication link 25. For example, when communication link 25 transmits bits at a rate of 9600 bits-per-second (or "bps"), each slot 50 may contain up to 2400 bits and bit-time 52 is ¹⁄₉₆₀₀ seconds—or approximately 105 micro-seconds. As illustrated in FIG. 4, each slot 50 may include message 55, where message 55 is the data transmitted via communication link 25. Message 55 is preferably centered within each slot 50 (i.e., equal numbers of bit-times 52 on either side of message 55) to allow maximum time between messages 55 transmitted via communication link 25.

According to one embodiment of TDMA, each device (e.g., gateway device 10 or remote device 20) in wireless network 1 has synchronized timing. Devices on wireless network 1 may synchronize their timing to enable each device to identify the start and stop of each slot 50 within the margin of error allowed. Spacing between messages 55 allows devices on wireless network 1 to have some margin for timing error, but when messages 55 are transmitted in a wrong slot 50 or overlapping slots 50, or otherwise exceed that margin for timing error, message 55 will not be received properly or may interfere with other messages 55 sent by other devices on wireless network 1. The structure of an exemplary message 55 is illustrated in FIG. 4 where the message contains content 55a, the current time 55b, and an elapsed time 55c.

Figure 5B:
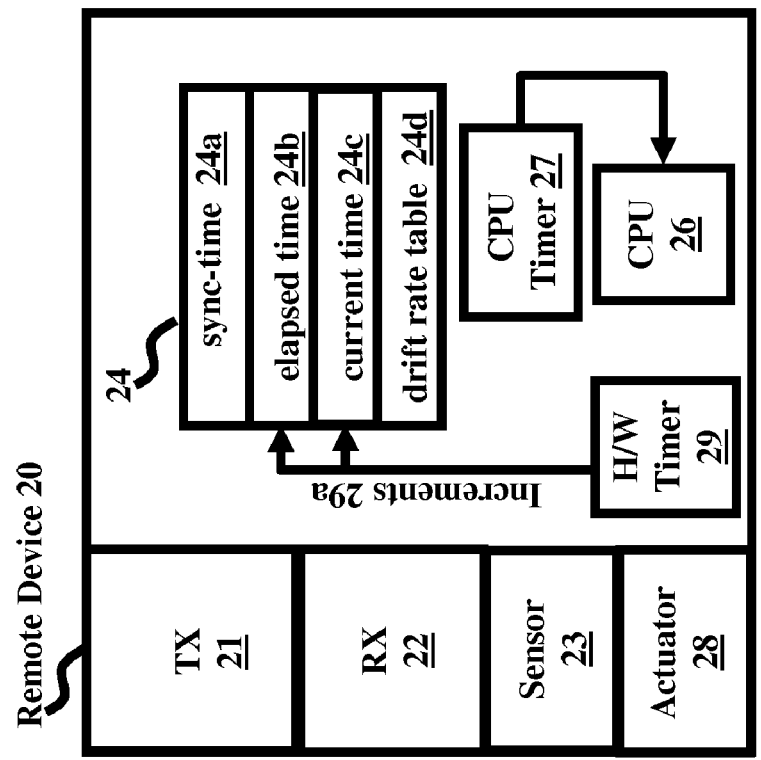
FIG. 5B is a schematic diagram illustrating a remote device, according to embodiments described herein.
Figure 5A:
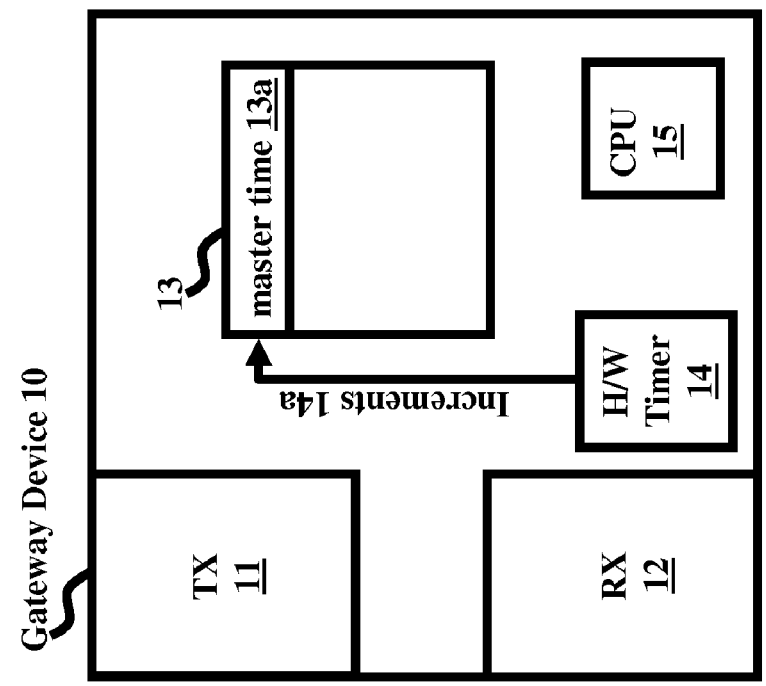
FIG. 5A is a schematic diagram illustrating a gateway device, according to embodiments described herein.

FIG. 5A, with reference to FIG. 3, illustrates a schematic diagram of gateway device 10. As shown, gateway device 10 includes transmitter 11, receiver 12, memory 13, hardware clock/timer 14, and central processing unit (CPU) 15. While not shown in FIG. 5A, transmitter 11, receiver 12, memory 13, hardware clock/timer 14 may be coupled and operatively in communication with CPU 15. In addition to the structure shown in FIG. 5A, gateway device 10 may include similar structures to those illustrated in FIG. 11 and described below. Referring to FIG. 5A, transmitter 11 and receiver 12 allow gateway device 10 to communicate with wireless mesh network 1 via communication links 25. Memory 13 may constitute any computer-readable medium. Examples of a computer-readable medium include a semiconductor or solid-state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD. In addition, memory 13 includes storage for master time 13a (as described in further detail below) which is periodically incremented by action of hardware timer 14 and may also optionally be adjusted by CPU 15.

In addition, as shown in FIG. 5A, gateway device 10 may contain one or more hardware timers such as hardware timer 14 that count the oscillations of precision oscillators such as quartz-crystal oscillators (XO) or temperature-compensated quartz-crystal oscillators (TCXO). Gateway device 10 optionally uses hardware timer 14 to measure the passage of time and maintain and automatically update (e.g., via increments 14a) an accurate master time 13a, for example, the current time of day. For example, hardware timer 14 may contain an oscillator that oscillates millions of times per second (e.g., 10 MHz or 15 MHz) to provide a very fine-grained measurement of time, or hardware timer 14 might track the passage of time in units of bit times 52. Moreover, remote devices 20 connected to wireless network 1 optionally synchronize with master time 13a to precisely determine the start of each frame 40, slot 50, and message 55. While not shown in FIG. 5A, gateway device 10 may also contain other oscillators such as lower-power lower frequency oscillators (e.g., 32768 Hz) and oscillators that are used to transmit and receive radio frequency signals. While not shown in FIG. 5A, memory 13 may also contain frequency offset tables for other oscillators in gateway device 20 that may be used to compensate for temperature and other variations in oscillation frequency using the methods and systems described herein.

FIG. 5B, with reference to FIGS. 3 through 5A, illustrates a schematic diagram of remote device 20. As shown, remote device 20 may include transmitter 21, receiver 22, sensor 23, actuator 28, memory 24, hardware timer 29 that is used to measure the passage of time and maintain and automatically update (e.g., via increments 29a) accurate measures of elapsed time 24b and current time 24c, central processing unit 26, and optionally an additional oscillator/timer 27 that controls the actions of central processing unit 26. In addition, while not shown in FIG. 5B, transmitter 21, receiver 22, sensor 23, oscillator/timer 27 actuator 28, memory 24, hardware timer 29 may be coupled and operatively in communication with central processing unit 26. Thus, for example, the hardware timer 29 may be a low frequency oscillator that oscillates thousands of times per second (e.g., 32768 times per second) and the CPU oscillator/timer 27 may be a high frequency oscillator that oscillates millions of times per second (e.g., 14.7456 MHz). While not shown in FIG. 5B, remote device 20 may also contain other oscillators such as oscillators that are used to transmit and receive radio frequency signals. In addition to the structure shown in FIG. 5B, remote device 20 may include similar structures to those illustrated in FIG. 11 and described below. Referring to FIG. 5B, transmitter 21 and receiver 22 allow remote device 20 to communicate with wireless mesh network 1 via communication links 25. Sensor 23 may include an automatic utility meter reading or other electronic or optical sensing devices. Actuator 28 may be a valve or solenoid or similar device. Such an automatic utility meter reading device may detect utility usage according to a utility meter; e.g., a gas, water, or electric utility meter. Memory 24 may constitute any computer-readable medium. Examples of a computer-readable medium include a semiconductor or solid-state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD. In addition, memory 24 includes storage for sync time 24a, elapsed time 24b, current time 24c, and a drift rate table 24d (as described in further detail below). While not shown in FIG. 5B, memory 24 may also contain frequency drift and/or offset tables for each oscillator in remote device 20 that is synchronized and/or compensated for temperature and other variations in oscillation frequency using the methods and systems described herein.

As shown in FIG. 5B, each remote device 20 contains hardware timer 29 that counts oscillations of a precision oscillator; e.g., a quartz-crystal oscillator. Each remote device 20 uses hardware timer 29 to measure the passage of time with fine-grained accuracy (e.g., units of bit times 52) and to maintain an accurate measure of elapsed time 24b and current time 24c (e.g., clock time). Hardware timer 29, by accurately maintaining current time 24c, also allows each remote device 20 to identify the start of each frame 40, slot 50, and message 55. In addition, the plurality of remote devices 20 synchronize each hardware timer 29 and stored current time 24c with hardware timer 14 and master time 13a of gateway device 10 through methods described in further detail below.

As shown in FIG. 4, every message 55 sent from devices on network 1 (e.g., gateway device 10 and remote devices 20) includes timing synchronization data. For example, every message 55 transmitted via communication link 25 includes the message content 55a, current time 55b, and elapsed time 55c (further described and shown in FIG. 6; elapsed time is referred to as "timing age" in U.S. patent application Ser. No. 11/408,053, although, as used herein, timing age does not include a hop count). Message content 55a is the content intended to be transmitted between devices; e.g., remote device 20 may send gateway device 10 new data from sensor 23 as message content 55a. Current time 55b is automatically appended to message content 55a and includes the value of current time 24c as maintained by hardware timer 29 when message 55 is transmitted. Elapsed time (timing age) 55c is also automatically appended to message content 55a, and may include of the value of elapsed time 24b stored in memory 24 as maintained by hardware timer 29 when remote device 20 is transmitting message 55 or may include a default value of "0" when gateway device 10 is transmitting message 55. The elapsed time 24b is the difference between the current time 24c and the synchronization time 24a; those of ordinary skill in the art will understand that current time 24c and elapsed time 24b may be used to derive synchronization time 24a (24a=24c−24b) or equivalently current time 24c and synchronization time 24a may be used to derive elapsed time (24b=24c−24a) and therefore the transmitted message may contain any two of the three times (elapsed, synchronization, or current) and the receiving device will be able to calculate all three times.

FIGS. 6 and 7, with references to FIGS. 1 through 5B, illustrate transmissions between various devices in wireless network 1. In particular, FIGS. 6 and 7 show master time 13a, stored on gateway device 10, propagating to the various remote devices 20 through wireless network 1. As illustrated in FIG. 4, every transmission sent by gateway device 10 includes current time 55b derived from the master time 13a (e.g., Jul. 4, 2009 2:53 PM and 2.4625 seconds) as maintained by hardware timer 14, and optionally an elapsed time (timing age) 55c. According to the embodiments shown in FIGS. 6 and 7, elapsed time (timing age) 55c has a default value of "0" when a message is transmitted by gateway device 10. In addition, as discussed above, gateway device 10 may construct the current time 55b in outgoing transmissions to allow a receiving remote device 20 to identify master time 13a with fine-grained accuracy (e.g., bit-time 52 (or 1-data-bit)). For example, when the transmission rate of communication links 25 is 9600 bps, the resolution of the master time 13a sent as message element 55b by gateway device 10 would be ±1/9600 seconds, or approximately 105 micro-seconds. When any remote device 20 receives message 55 from gateway device 10, remote device 20 updates its stored current time 24c and its stored sync time 24a to the current-time value 55b specified in message 55 and updates its stored elapsed time 24b to the elapsed time 55c received in message 55, thus synchronizing it with the master time 13a maintained in the gateway device 10 and noting the time of that synchronization (sync time 24a); thereafter, until the next message 55 is received from gateway device 10, remote device 20 uses hardware timer 29 to track the passage of time and update current time 24c and elapsed time 24b.

In addition, as illustrated in FIG. 4, every transmission sent by remote device 20 includes current time 55b as derived from current time 24c which is maintained by hardware timer 29. Additionally, remote device 20 may construct message 55 to allow a receiving remote device 20a to identify current time 55b with bit-time 52 (or 1-data-bit) of accuracy. Remote devices 20 may also include in message 55 the elapsed time 55c derived from elapsed time 24b value stored in memory 24 and incremented by hardware timer 29, which indicates the elapsed time since a message was transmitted by gateway device 10 containing master time 13a to which remote device 20 and optionally intervening remote devices 20 have synchronized their current time 24c; the time at which the original master time 13a was transmitted and used for remote device synchronization is stored in each remote device memory 24 as sync-time 24a. Thus, elapsed time 24b is an age measurement of the time elapsed between transmission by gateway device 10 of current time 55b as derived from master time 13a (which time is stored by remote device 20 in memory 24 as sync-time 24a) and transmission by remote device 20 of a message with current time 55b as derived from current time 24c (elapsed time 24b=current time 24c−sync time 24a) which current time 24c is synchronized to said master time 13a. The elapsed time age measurement indicates the "freshness" of current-time 24c being transmitted (55b);

and indirectly indicates how closely the transmitted current time 55b may be synchronized with the master-time 13a on gateway device 10.

According to the embodiment shown in FIGS. 6 and 7, a lower elapsed time 24b value indicates a more reliable current time 24c (better synchronized with master time 13a) compared to a higher elapsed time 24b value, because as the elapsed time 24b between sync time 24a and current time 24c increases, current time 24c stored in remote device 20 and maintained and updated by hardware timer 29 will be subjected to greater drift effects in hardware timer 29 relative to hardware timer 14 due to differences in manufacturing tolerances, age of the devices and temperature variations (as described below). Referring to FIG. 3, if gateway master time 13a is transmitted to remote device 20 (e.g., device E) through multiple intervening remote device 20s (e.g., devices A, C, D), the variations in frequency between gateway hardware timer 14 and each of the intervening hardware timers 29A, 29C, 29D will result in the introduction of cumulative timing error such that the drift error incurred between gateway master time 13a and remote device 20 (device E) current time 24c will be the sum of the drift errors introduced by each intervening remote device 20A, 20C, 20D during the time elapsed between message (55) transmissions from A to C, C to D, and D to E. Consider for example, gateway 10 transmits master time 13a in message 55 and remote device A receives said master-time 55b and synchronizes its hardware timer 29A and current time 24c with said master time. Remote device A current time 24c is at that point synchronized with gateway master time 13a to within a single data bit time (52) of accuracy. Remote device A then attempts to maintain accurate current time 24c using hardware timer 29A and whenever it transmits a message 55, includes that current time 24c in message 55b. Remote device A also uses hardware timer 29A to track the elapsed time 24b since current time 24c was synchronized with gateway master time 13a. Because hardware timer 29A in remote device A does not operate at precisely the same frequency as gateway hardware timer 14, during the time elapsed between the synchronization of device A current time 24c with gateway device 10 master time 13a and the transmission of message 55 by device A (e.g., 20 minutes after said synchronization), current time 24c in remote device A may have drifted slightly when compared to gateway device 10 master time 13a. Accordingly, remote device A transmits elapsed time 24b (e.g., 20 minutes) in message 55c along with current time 24c in message 55b to indicate the period of time that current time 24c (as maintained by hardware timer 29A) has been drifting relative to the master time 13a as maintained in gateway device 10 by hardware timer 14. If remote device A does not receive another synchronizing message 55 from gateway device 10 for another twenty minutes, when remote device A transmits another message 55, it will transmit current time 24c as maintained by hardware timer 29A and elapsed time 24b (also maintained by hardware timer 29A) indicating that current time 24c has been drifting for 40 minutes since last synchronized with gateway device 10. When said second transmission from device A is received by remote device 20 C, remote device 20 C may synchronize its current time 24c with the current time transmitted by remote device A in message 55b and will store as elapsed time 24b the time indicated for drift by remote device A (e.g., 40 minutes) in message 55c. Following reception of the synchronizing message from remote device A, remote device C will attempt to accurately track current time 24c and elapsed time 24b using its hardware timer 29C. If device C transmits a message 20 minutes later without having received another synchronizing message from remote device A, it will transmit current time 24c and elapsed time 24b indicating an elapsed time of 60 minutes: the cumulative elapsed time that hardware timers 29A and 29C have drifted without synchronization with gateway master time 13a. By transmitting elapsed time 55c with each message 55, any remote device receiving said message can determine whether the current time 55b received in said message has been derived from a current time 24c that has incurred more or less cumulative drift time 24b than the current time 24c stored in the receiving device by comparing the cumulative drift time 24b of the receiving device with the transmitted cumulative drift time 55c.

In particular, FIG. 6, with reference to FIGS. 1 through 5B, illustrates a flow diagram of wireless distribution method of timing synchronization. As described above, gateway device 10 may serve as master time source in wireless network 1. Consequently, the steps described in FIG. 6 are optionally performed by each remote device 20 in wireless network 1. Initially, at step 60, message 55 is received by remote device 20. At step 61, remote device 20 determines whether gateway device 10 or another remote device 20 transmitted message 55. If, at step 61, remote device 20 determines that gateway device 10 transmitted message 55, remote device 20 receiving the message 55 sets stored current time 24c to received current time 55b, sets sync-time 24a to received current time 55b and further sets elapsed time 24b to the received elapsed time 55c in step 62 (typically 0) and processes message content 55a in step 64. Otherwise, if message 55 was not received from a gateway device 10 but rather from another remote device 20, remote device 20 receiving the message 55 compares received elapsed time 55c with stored elapsed time 24b in step 63. When received elapsed time 55c is less than stored elapsed time 24b, remote device 20 receiving message 55 sets stored current time 24c to received current time 55b, sets stored sync time 24a to received current time 55b minus received elapsed time 55c and further sets stored elapsed time 24b to received elapsed time 55c in step 65, and processes message content 55a in step 64. Otherwise, if message 55 was received from another remote device 20 and the elapsed time transmitted by remote device 20 in message 55c is larger than the stored elapsed time 24b, remote device 20 ignores current time 55b and elapsed time 55c and processes message content 55a in step 64. In step 66, the process shown in FIG. 6 waits for next message 55.

FIG. 7, with reference to FIGS. 1 through 6, illustrates a table of sample transmissions between devices on wireless network 1. The table in FIG. 7 includes five columns, where column 70 describes the message number, column 71 describes the message transmitter, column 72 describes the message sent, column 74 describes the receiver and column 75 describes the action taken by the receiver upon receiving the message. In addition, as described above, each message 55 described in column 70 (e.g., message 55.1 through 55.8) includes message content (e.g., 55.1a through 55.8a), current time (e.g., 55.1b through 55.8b), and elapsed time (e.g., 55.1c through 55.8c).

As shown in columns 71 through 74, message 55.1 includes "current time 55b=2:53:02 and elapsed time 55c=0 seconds" that is sent from gateway device 10 and is received by remote device 20 A. Since message 55.1 was sent by gateway device 10, column 75 indicates remote device 20 A sets its stored current time 24c and sync-time 24a to "2:53:02" and resets its elapsed time 24b to "0". Message 55.2 is a message 55 transmitted 3 seconds later by remote device 20 A that includes "current time 55b=2:53:05 and elapsed time 55c=3 seconds"; the message is received by remote device 20 B. Since remote device 20 B has not received any prior transmissions, it does not have an elapsed time 24*b* value stored (thereby effectively giving elapsed time 24*b* a maximum possible value); since elapsed time 55.2*c* (3 s) is less than elapsed time 24*b* (max value) remote device 20 B sets its stored current time 24*c* to "2:53:05", its stored sync-time 24*a* to "2:53:02" indicating that current time 24*c* is based on a gateway time transmission that occurred at 2:53:02, and elapsed time 24*b* to "3". Message 55.3 is a message 55, as described above, transmitted 55 seconds later by remote device 20 B that includes "current time 55*b*=2:54:00 and elapsed time 55*c*=58 seconds". When remote device 20 A receives message 55.3, it does not update its current time 24*c* maintained by hardware timer 29 and does not update stored elapsed time 24*b* or sync time 24*a* and ignores received current time 55.3*b* and elapsed time 55.3*c* because received elapsed time 55.3*c* (58 seconds) and stored elapsed time 24*b* (58 seconds) are equal (which indicates that the sync times 24*a* of both remote devices 20 A and B are equal and so the current time 24*c* of both devices are equally well synchronized with gateway device 10 master time 13*a*).

Message 55.4 is transmitted by gateway device 10 5 seconds later that is received by remote device 20 A, and proceeds, as described above for message 55.1, to update current time 24*c* and elapsed time 24*b* (subsequently maintained by hardware timer 29 A) and sync time 24*a* on remote device 20 A. Message 55.5 is a message 55, as described above, transmitted 7 seconds later by remote device 20 A that includes "current time 55*b*=2:54:12 and elapsed time 55*c*=7 seconds" and received by remote device 20 B. Since remote device 20 B did not receive message 55.4, the last message 55 received by remote device 20 B was message 55.2 described above. Hence, received elapsed time 55.5*c* (7 seconds) is less than stored elapsed time 24*b* (1 minute 10 seconds) which has been increasing steadily since remote device 20 B received message 55.2 due to the action of hardware timer 29 B and so remote device 20 B sets its current time 24*c* as maintained by hardware timer 29 B to "2:54:12", sync-time 24*a* to "2:54:05" (received time 55*b* of 2:54:12 minus received elapsed time 55*c* of 7) and elapsed time 24*b* to "7".

Message 55.6 includes "current time 55*b*=2:54:16 and elapsed time 55*c*=0" that is sent from gateway device 10 and is received by remote device 20 B. Since message 55.6 was sent by gateway device 10 and has an elapsed time 55*c* of 0 seconds, remote device 20 B sets its current time 24*c* and sync-time 24*a* to received current time 55*b* "2:54:16" and resets its elapsed time 24*b* to "0"; current time 24*c* and elapsed time 24*b* are subsequently incremented by hardware timer 29 B. Message 55.7 is a message 55, as described above, that includes "current time 55*b*=2:54:17 and elapsed time 55*c*=12 seconds" transmitted by remote device 20 A and received by remote device 20 B. Since remote device 20 A did not receive message 55.6, the last message received by remote device 20A was 55.4 12 seconds earlier and so elapsed time 55.7*c* is "12"; since remote device 20 B did receive message 55.6, stored elapsed time 24*b* in remote device 20 B is "1". Consequently, with message 55.7, remote device 20 B does not update its stored current time 24*c*, stored sync time 24*a*, or stored elapsed time 24*b* and ignores received current time 55.7*b* and elapsed time 55.7*c* because received elapsed time 55.7*c* is greater than stored elapsed time 24*b* as maintained by hardware timer 29 B. Message 55.8 is a message 55, as described above, that includes "current time 55*b*=2:54:18 and elapsed time 55*c*=2 seconds" transmitted by remote device 20 B and received by remote device 20 A. Since remote device 20 A did not receive message 55.6, the last message 55 received by remote device 20 A was message 55.4 described above. Hence, received elapsed time 55.8*c* (2 seconds) is less than stored elapsed time 24*b* (13 seconds) which has been increasing due to hardware timer 29 A since it was last updated by message 55.4 and so remote device 20 A sets its current time 24*c* to "2:54:18", sync-time 24*a* to "2:54:16" (received current time 55.8*b* minus received elapsed time 55.8*c*) and elapsed time 24*b* to received elapsed time 55.8*c* "2".

Thus, as illustrated in FIGS. 6 and 7, remote devices 20 update sync-time 24*a* and elapsed time 24*b* and current time 24*c* upon receiving a message 55 with a lower elapsed time 55*c* than the currently stored elapsed time 24*b* which is stored locally in memory 24 and maintained by hardware timer 29. While not shown in FIG. 6 or 7, remote device 20 also notes the time that said update due to reception of message 55 last took place ("time synchronized"); this is described in more detail related to FIG. 10 below. Consequently, when each remote device 20 synchronizes their respective current time 24*c* with a received current time 55*b* (i.e., whenever a message 55 is received with a lower elapsed time 55*c* than what is currently stored locally in elapsed time 24*b*), the cumulative effects of drift due to variations in each hardware timer 29 (e.g., due to variations in crystal oscillators residing in each remote device 20) are minimized as current time 55*b* based on the most recent sync-time 24*a* propagates through wireless network 1. Moreover, remote devices 20 synchronize their current time 24*c* with sources that offer the lowest opportunity for cumulative drift.

As described above, between reception of synchronizing messages 55 (messages with elapsed time 55*c* lower than stored elapsed time 24*b*), a remote device 20 in wireless network 1 measures the passage of time using a hardware timer (e.g., hardware timer 29) that counts the oscillations of a precision crystal oscillator (XO) or similar time reference and periodically increments stored current time 24*c* and elapsed time 24*b*. Since each oscillator will vary slightly in frequency, however, the various hardware timers (e.g., hardware timer 14 and hardware timer 29) in the devices (e.g., gateway device 10, remote device 20) of wireless network 1 will drift with respect to each other until they are synchronized through reception of appropriate wireless messages. If the drift is sufficiently fast or the drift duration sufficiently long, the current times 13*a* and 24*c* maintained by these various hardware timers (e.g., hardware timer 14 and hardware timer 29) may drift apart until TDMA communications cannot be maintained because the devices (e.g., gateway device 10, remote device 20) on wireless network 1 do not recognize the same frame and timeslot boundaries; e.g., offset divisions of frame 40, super frame 45 and slot 50.

Variations in oscillator timing are caused by a number of factors including: crystal and other component manufacturing variations, temperature induced variations, mechanical effects of crystal aging, and crystal type and frequency. As a result of these variations, a crystal oscillator that should nominally be oscillating 32768 times per second may actually be oscillating 32767 times per second or 32769 times per second or 32766.0035 times per second. When accumulated over extended periods, these differences in oscillation frequency can result in substantial timing error sufficient to cause devices (e.g., gateway device 10, remote device 20) on wireless network 1 to lose synchronization and therefore fail to communicate in a TDMA network.

Since the impact of the variations in hardware timers (e.g., hardware timer 14 and hardware timer 29) located in devices on wireless network 1 can be severe, embodiments described herein may compensate for hardware timer (e.g., hardware timer 14 and hardware timer 29) variations incurred during the times between synchronizing messages. The methods and systems herein may also optionally use the synchronizing messages and compensated timers to compensate for variations in other oscillators (e.g. radio frequency oscillators) in gateway device 10 and remote device 20.

One example of variations in hardware timers (e.g., hardware timer 14 and hardware timer 29) located in devices on wireless network 1 results from differences in manufacturing tolerances. Manufacturing tolerances may cause crystal oscillators and even temperature-compensated crystal oscillators to vary from their specified nominal frequency by a fixed offset. For example, a 10 MHz crystal manufactured with 20 ppm tolerance may oscillate anywhere from 9999800 Hz to 10000200 Hz. Differences in manufacturing tolerances can result in hardware timers (e.g., hardware timer 14 and hardware timer 29) built with such oscillators that operate from time sources that are as much as 40 ppm apart (e.g., one is −20 ppm, the other is +20 ppm) even when running at the same temperature with oscillators of the same age. As described above, these differences, due to manufacturing tolerances, can introduce substantial accumulated error over time. As a result, in the embodiments described herein, oscillator errors due to oscillator manufacturing tolerances may be compensated and corrected as part of the manufacturing process of the device incorporating said oscillator. One example of compensating for manufacturing tolerance errors is a method to measure the actual crystal frequency of each hardware timer (e.g., hardware timer 14 and hardware timer 29) when it is manufactured and storing both nominal and actual frequencies in memories 13 or 24. Thus, devices (e.g., gateway device 10 and remote device 20) on wireless network 1 using a hardware timer (e.g., hardware timer 14 and hardware timer 29) can each access the stored nominal and actual frequencies of their individual oscillators. When a device establishes the actual frequency of one oscillator, it may optionally measure the frequency of other oscillators in the same device by comparing their nominal oscillation frequencies with their actual frequency as measured using the oscillator whose actual frequency was determined at manufacture.

FIG. 8, with reference to FIGS. 1 through 7, illustrates a flow diagram describing a mechanism of compensating for manufacturing tolerances, according to embodiments described herein. As shown in FIG. 8, step 80 describes measuring and storing both a nominal and actual frequency of a hardware timer (e.g., hardware timer 14 and hardware timer 29) residing in a device (e.g., gateway device 10 and remote device 20) on wireless network 1; this step is typically performed when the device is manufactured. While not shown in FIGS. 1 through 7, a copy of both the nominal and actual frequency may be stored on a local memory (e.g., memory 13 and memory 24). Step 81 describes accumulating the count of oscillations of the hardware timer which is running at the measured (actual) frequency, and computing the number of oscillations that would have occurred if the oscillator were running at its nominal frequency and computing the count difference between the two (count difference=oscillation count−(oscillation count*(actual frequency/nominal frequency)) and converting that to a time difference (time difference=count difference/nominal frequency). Step 82 compares the accumulated time difference until the difference exceeds one bit-time of timing error; this accumulation may occur, for example, after each oscillation of the hardware timer (e.g., hardware timer 14 and hardware timer 29) or may simply be interpolated based on the ratio of the nominal to actual frequency. Moreover, this accumulation may be performed, for example, by the central processing unit or microcontroller (e.g., CPU 15 and CPU 26). At step 82, the device (e.g., gateway device 10 and remote device 20) compares the accumulated time difference with the time granularity maintained for current time 24c and elapsed time 24b; e.g., the time that will elapse during the period required for transmission of one data bit (bit-time 52 as described in further detail below). Step 82 may be performed, for example, after each slot 50 in frame 40. If the time difference compared in step 82 is less than the required granularity; e.g., one bit-time 52, the time difference continues to be accumulated in step 81; once the time difference equals or exceeds the required granularity, at step 83, current time 24c and elapsed time 24b may be adjusted (e.g., forward one bit-time 52 or backwards one bit-time 52) and the accumulated time difference is reduced by the same amount. While not shown in FIG. 8, the same methods may be used to compensate for manufacturing tolerances in other oscillators such as radio frequency (RF) oscillators wherein the actual frequency of the RF oscillator may be determined (for a particular temperature) at the time of manufacture or in operation by measurement of the RF oscillator against another oscillator whose frequency is known (e.g., hardware timer 29). In operation, the device (remote device 20 or gateway device 10) adjusts the tuning of its radio local oscillator to compensate for the difference between the measured actual and nominal frequency of the RF oscillator. The methods and system described herein also allow the RF oscillator frequency to be measured and dynamically compensated for variations due to temperature and other sources of variation as described below.

Thus, as described in FIG. 8, the timing error between nominal and actual frequency in hardware timer 14 or hardware timer 29 is accumulated with the fine-grained resolution of the oscillator during normal device (e.g., gateway device 10 or remote device 20) operation. Periodically, the difference in nominal and actual counts is compared until it exceeds bit-time 52 (e.g., one bit-time) at which point the current time 24c and elapsed time 24b (or in the case of gateway device 10: master time 13a) as maintained by the hardware timer (e.g., hardware timer 14 and hardware timer 29) used to maintain synchronization with other devices are either advanced or retracted one bit based on the accumulated error to correct for the manufacturing tolerance error. For example, a device (e.g., gateway device 10 or remote device 20) with an oscillator manufactured to operate with a nominal frequency of 14745600 Hz is measured, after manufacture, to have an actual frequency of 14745500 Hz (100 Hz lower than nominal). During operation, the aforementioned difference between nominal and actual frequency will cause the hardware timer (e.g., hardware timer 14 and hardware timer 29) to count more slowly than it should and the stored current and elapsed times (13a or 24c and 24b) maintained by the hardware timer (14 or 29) will need to be advanced periodically to compensate.

Thus, according to the example above, if the hardware timer (e.g., hardware timer 14 and hardware timer 29) is advanced 25 counts for every slot 50 lasting ¼ second, the hardware timer will provide timing synchronized with other devices on wireless network 1 that are running at the nominal 14745600 Hz. Those skilled in the art will understand that if a different timer resolution is used, such as a hardware timer counting at a 9600 Hz rate, the hardware timer will advance one count for each 1536 oscillations of a nominal 14745600 Hz crystal oscillator. Moreover, the accumulated difference in oscillation counts between nominal and actual oscillation frequency will need to be stored (e.g., in memory 13 or memory 24) and incremented over time (e.g., increasing the accumulated total by 100 each second) until the accumulated difference exceeds 1536 (which will take just over 15 seconds)—at which point the hardware timer will be advanced one count to compensate for the manufacturing variance of the slower (14745500 Hz) oscillator and the stored accumulated difference is reduced by 1536.

Another example of variations in hardware timers (e.g., hardware timer 14 and hardware timer 29) located in devices (e.g., gateway device 10 and remote device 20) on wireless network 1 results from oscillator age differences and environmental differences (e.g., a temperature difference). For example, crystal oscillators change in frequency with age. With respect to oscillator variations attributable to differences in age, the most significant changes occur within the first year of operation and changes are minimal thereafter. In addition, crystal oscillators vary in frequency with ambient temperature. For example, many low-frequency crystal oscillators (LFXO) such as those commonly used for hardware timer 29 oscillate at their nominal frequency at 25° C. but oscillate more slowly as the temperature deviates from 25° C. following a predictable parabolic curve. Thus, a 32768 Hz LFXO may vary ±300 ppm or more as the ambient temperature varies over the operating temperature range of the device.

High-frequency crystal oscillators (HFXO) such as those commonly used for CPU timer 27 also vary with temperature but the variations typically follow a complex S-shaped curve that requires more expensive manufacturing processes to predict (e.g., sampling at 3 different temperatures). HFXOs typically vary less with temperature than LFXOs, albeit less predictably. For example, a 15 MHz oscillator may vary ±15 ppm with ambient temperature over the operating temperature range of the device.

A micro-controller or CPU often uses an HFXO that may operate at 10-20 million oscillations per second (10-20 MHz). Moreover, HFXOs often consume significantly more power than LFXOs that are commonly used for timers in real-time-clocks (or "RTC"). Devices that are power limited, such as battery-powered devices (e.g., remote devices 20 may be battery-powered), often contain both an HFXO and an LFXO so that when the device's CPU (e.g., CPU 26) is idle, the HFXO (e.g., CPU timer 27) may be disabled to lower power consumption while the LFXO (e.g., hardware timer 29) for the RTC tracks elapsed time. Remote devices 20 may contain two such crystal oscillator references, a high-frequency XO serving as the CPU clock/timer 27 and a low-frequency XO serving as the RTC clock/hardware timer 29.

Variations in XO frequency due to temperature or aging may impair wireless communication in wireless network 1 in the same ways as variations due to manufacturing variance. Temperature induced oscillator frequency variations are often the most significant variations and compensating for them can be critical to the proper operation of a system using these oscillators. Compensation may be achieved in a number of ways; most require an a-priori knowledge of the oscillator's temperature variation characteristics which requires expensive manufacturing processes. The system and methods described in these embodiments compensate for temperature and other oscillator rate variations without a-priori knowledge of said characteristics and also dynamically adapt to changes in oscillation frequency over time. In particular, low-power devices (e.g., remote devices 20) that may not receive frequent wireless messages that synchronize their timing as described above often require adjustment for timing drift because these devices may drift uncorrected over much longer periods of time. As discussed in further detail below, the embodiments described herein make use of either a higher-accuracy local oscillator such as CPU timer 27 or a higher accuracy remote oscillator such as hardware timer 14 to determine and compensate for the drift rate of a lower accuracy local oscillator such as hardware timer 29 over time and temperature. The embodiments described herein may leverage the different characteristics of a higher power, higher accuracy frequency standard such as an HFXO (e.g., CPU timer 27) and a lower power, lower accuracy frequency standard such as an LFXO (e.g., hardware timer 29) in a remote device 20, to improve the overall accuracy of timing and frequency within each remote device 20 in wireless network 1 while operating with a continuously running lower accuracy frequency standard and periodic use of a higher accuracy frequency standard.

Figure 9:
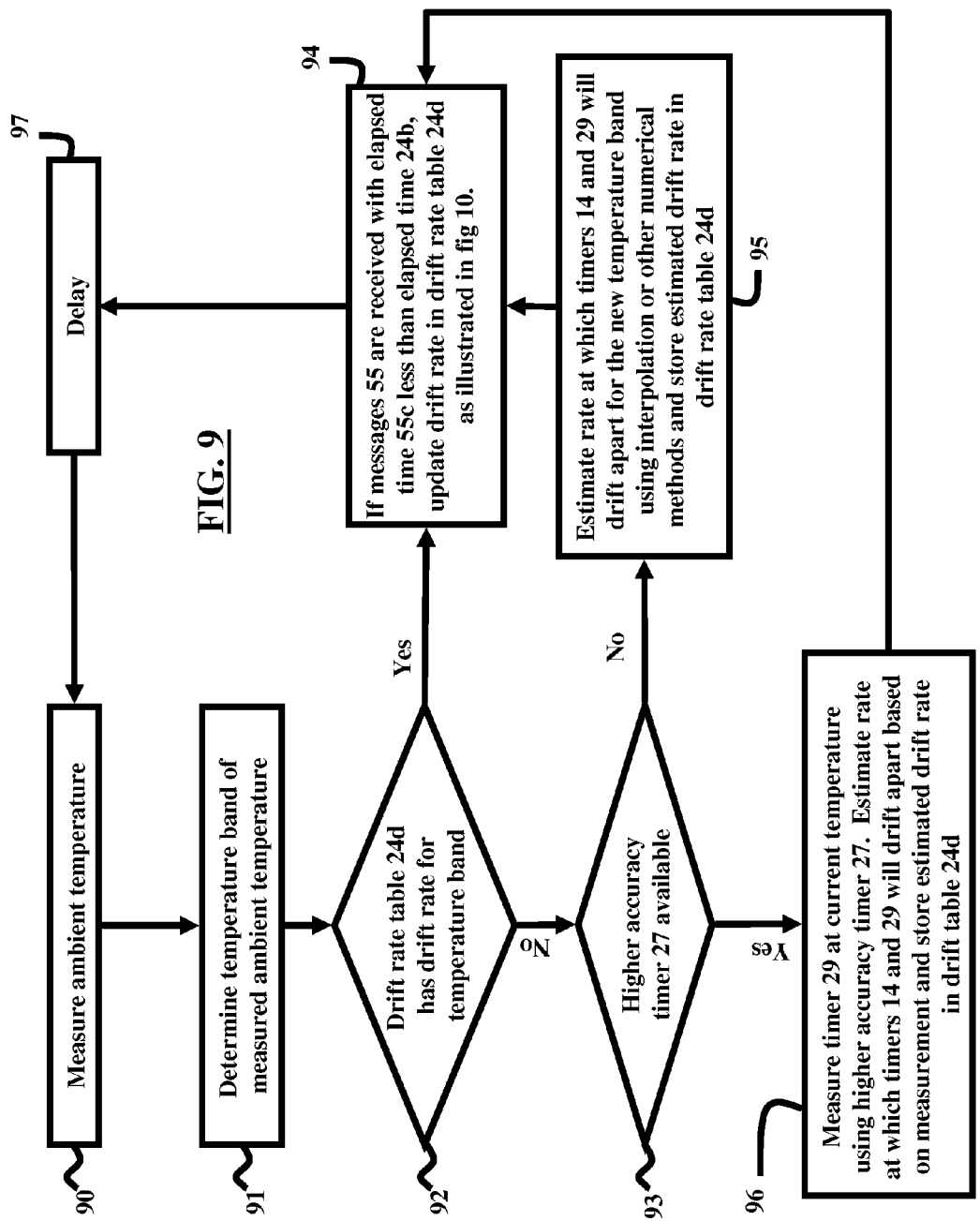
FIG. 9 is a flow diagram of one example method of compensating for initially detected temperature variations in oscillators, according to embodiments described herein.

FIG. 9, with reference to FIGS. 1 through 8, illustrates a flow diagram of a method to compensate for systematic variations in timing, which may include temperature differentials. Although not explicitly shown in FIG. 9, the method described therein compensates for systemic timing variations in wireless mesh network 1 because, as discussed below, the drift rate of the hardware timers 29 in each remote device 20 are continually measured by observations of the current time 24c drift relative to other devices in the network as discovered through received wireless messages 55 containing current time 55b; the measured drift rates are the aggregate of all sources of drift and consequently the measured drift rates can be used to compensate for all systematic sources of drift at the same time. The drift compensation described below enables the hardware timers (e.g., hardware timer 14 and hardware timer 29) to be synchronized with a very high degree of accuracy (e.g., 1-2 ppm) at any given temperature. Because the frequencies of the hardware timers vary with temperature, different drift rates must be calculated, stored, and used for drift compensation at different temperatures. In particular, the method shown in FIG. 9 builds a table of operating temperatures and corresponding drift rates of hardware timer 29 relative to the nominal timing rate within a device (e.g., remote device 20). While not shown in FIG. 9, such a table may be stored, for example, as a list or similar data structure in memory 24 e.g., as drift rate table 24d. The method of FIG. 9, at step 90, measures the ambient temperature surrounding the device (e.g., remote device 20). Step 91 subsequently determines which of several temperature bands (described in further detail below) includes the measured ambient temperature. For each temperature range stored in the table, an initial drift rate estimate must be calculated which will subsequently be refined by the methods described herein. Next, step 92 determines whether an initial drift rate estimate has been previously calculated for the temperature band determined in step 91. When the ambient temperature measured in step 90 is included in a new temperature band (a band for which no drift rate estimate has been calculated), step 93 determines whether a higher accuracy local timer/oscillator (e.g., CPU timer 27) is present in the device. In step 96, if a higher accuracy local timer/oscillator is present, the higher accuracy oscillator (e.g., CPU timer 27) is used to measure the oscillation frequency of the lower accuracy oscillator (e.g., hardware timer 29) at the present ambient temperature and the difference between the measured frequency and the nominal frequency is used to derive a rate (drift rate) at which the lower accuracy oscillator will drift at the present ambient temperature relative to an oscillator operating at the nominal frequency; this drift rate is stored as the estimated drift rate for the relevant temperature band in the drift-rate table 24d. Alternatively, if a higher accuracy local timer/oscillator is not present, the method calculates an estimated drift rate using numerical methods such as interpolation of the drift rates of adjacent temperature bands or use of an algorithm that approximates the drift rate of a typical oscillator at the measured temperature; the estimated drift rate for the relevant temperature band is stored in the drift-rate table 24d in step

95. Once an initial drift-rate estimate has been stored in the drift-rate table 24*d*, the drift-rate is subsequently adjusted by the action of synchronizing wireless messages 55 as illustrated in step 94 and for which details are provided below and in FIG. 10. Finally, step 97 waits a period of time (where the amount of time is optionally predetermined) before returning to step 90 and measuring the ambient temperature again.

As described above, since the LFXO frequency of oscillation may vary parabolically with respect to temperature, the operating temperature range for device (e.g., remote device 20) is logically divided into temperature bands (the number of bands is optionally predetermined as N bands), spaced quadratically; i.e., bands cover a large range of temperatures near the vertex of the oscillator's parabolic frequency-to-temperature curve, and gradually include smaller ranges of temperatures further away from the vertex. Moreover, as mentioned above, each remote device 20 in wireless network 1 maintains a drift-rate table 24*d* containing the drift rates for each temperature band. The drift rate table is initially empty and as each device measures ambient temperatures within a given temperature band, the drift rate for that band is initialized with an estimate as described above and subsequently refined using the closed-loop control methods described below.

To better illustrate the method described in FIG. 9, a detailed example follows. A device (e.g., remote device 20) on wireless network 1 which contains a low accuracy LFXO hardware timer 29 and a high accuracy HFXO CPU timer 27 periodically measures ambient temperature (as described in step 90, shown in FIG. 9) and determines which of the N temperature bands described above contains the measured temperature (as described in step 91, shown in FIG. 9). When the ambient temperature enters a new temperature band for which a drift rate has not been calculated (a determination described in step 92, shown in FIG. 9) the device measures the LFXO frequency at that temperature using the HFXO and uses the measured frequency to calculate an estimated drift rate (as described in step 96, shown in FIG. 9). The LFXO frequency measurement may be performed using the HFXO, where the HFXO does not vary with temperature at the same rate as the LFXO and typically varies less relative to its nominal frequency. Consequently, the initial estimate of drift rate of the LFXO, for a temperature band, can compensate for the LFXO inaccuracies to make it nearly as accurate as the HFXO for the temperature band.

For example, with a nominal 32768 Hz LFXO and an HFXO, which has been measured to oscillate at 14745500 Hz, the actual frequency of the LFXO may be measured by counting the number of HFXO oscillations in 32768 LFXO oscillations; this count may be referred to as "LFXO_CNT" and used in the initial drift rate estimate calculations below. If the LFXO is operating at its nominal frequency within a detected temperature band (e.g., 32768 Hz), the expected LFXO_CNT count would be the same as the HFXO measured frequency. If the LFXO is running slowly due to temperature, aging, or other sources of variation, the LFXO_CNT count would be higher than the HFXO frequency. The frequency of the LFXO for the current temperature band may then be approximated as: LFXO_NOMINAL_FREQUENCY*HFXO_FREQUENCY/LFXO_CNT—where LFXO_NOMINAL_FREQUENCY is a predetermined nominal frequency of the LFXO and HFXO_FREQUENCY is the measured frequency of the HFXO.

Thus, if 14746000 HFXO oscillations were counted during 32768 LFXO oscillations, and if the HFXO frequency had been measured to be 14745500 Hz, the LFXO frequency at that temperature would be: 32768*14745500/14746000~=32766.8889 Hz. The error ratio of the actual LFXO frequency at that temperature (32766.8889 Hz) to the LFXO nominal frequency (32768 Hz) is: 32766.8889/32678~=0.9999661. In other words, the LFXO oscillates at 99.99661% of its nominal rate at the measured temperature. Moreover, the drift rate of this measured oscillation frequency relative to the nominal oscillation frequency may be calculated and stored in terms of a count of the operating speed (e.g., in units of bit-time 52) of communication links 25 in wireless network 1. Assuming communication links 25 operate at 9600 bps, the LFXO (e.g., hardware timer 29) drift rate may be stored in drift rate table 24*d* in terms of a count of 9600 bps bits of drift per hour; e.g., 9600 bits/sec*60 sec/min*60 min/hr=34560000 bits/hr. Those skilled in the art will recognize that rates of drift shown above are exemplary and the rates of drift may be calculated and stored using a variety of alternative units and methods.

Furthermore, the LFXO frequency at a given temperature may be easily converted to a drift rate in the appropriate terms; e.g., 34560000 bph*(1−0.9999661)~=1172 bits of drift per hour. The drift rate may then be used to adjust the hardware timer (e.g., hardware timer 29) counting elapsed bits or the stored current time 24*c* and elapsed time 24*b* by periodically advancing or retracting the hardware timer 29 or stored times by the number of bits of drift that accumulated over that period. For example, if the hardware timer 29 had operated at the given drift rate for 20 minutes, it would need to be advanced 1172 bits/hr*20/60 min/hr=391 bits to be synchronized with a hardware timer that had been running at the nominal frequency.

Alternatively, while not shown in FIG. 9, when an ambient temperature is measured to be in a new temperature band for which a drift rate estimate has not yet been calculated, an alternative initial drift rate estimate calculation may be made by interpolating (or extrapolating, as appropriate,) the drift rates of nearby temperature bands or by an algorithmic calculation (e.g. $-0.034$ ppm/$T^2$) based on the measured temperature and the expected frequency variation of the LFXO at that temperature. Methods of interpolating and extrapolating numeric values (e.g., an initial drift rate estimate) are known in the art.

In addition, although not shown in FIG. 9, after an initial drift rate estimate for a temperature band is made either by measuring the LFXO frequency using the HFXO, or by interpolation or other algorithmic methods, an initial drift rate estimate flag may be set to prevent the estimate from being performed a second time. The initial drift rate estimate flag is optionally stored as a Boolean variable in memory 24; however, those skilled in the art can readily devise alternative methods of access and storage to an initial drift rate estimate flag, and therefore the embodiments herein are not restricted to one particular method. Thereafter, adjustments to the drift rate for that temperature band are made, as described in step 94, shown in FIGS. 9 and 10. Such adjustments are optionally made by using a closed-loop control method described in FIG. 10 and discussed below.

While not shown in FIG. 9, other oscillators in gateway device 10 or remote device 20 may also be compensated for variations in temperature using similar methods by maintaining additional tables. For example, a radio frequency (RF) oscillator may be present in gateway device 10 or remote device 20; the RF oscillator actual frequency may be measured at each of a range of temperatures using another oscillator known to be of higher accuracy (e.g., hardware timer 14 or hardware timer 29 when synchronized with hardware timer 14) and the difference between nominal and actual frequencies at each temperature range stored in said additional table; this allows the synchronized timing of the devices in network 1 to be used to also synchronize the radio communication frequencies of the same devices.

Figure 10:
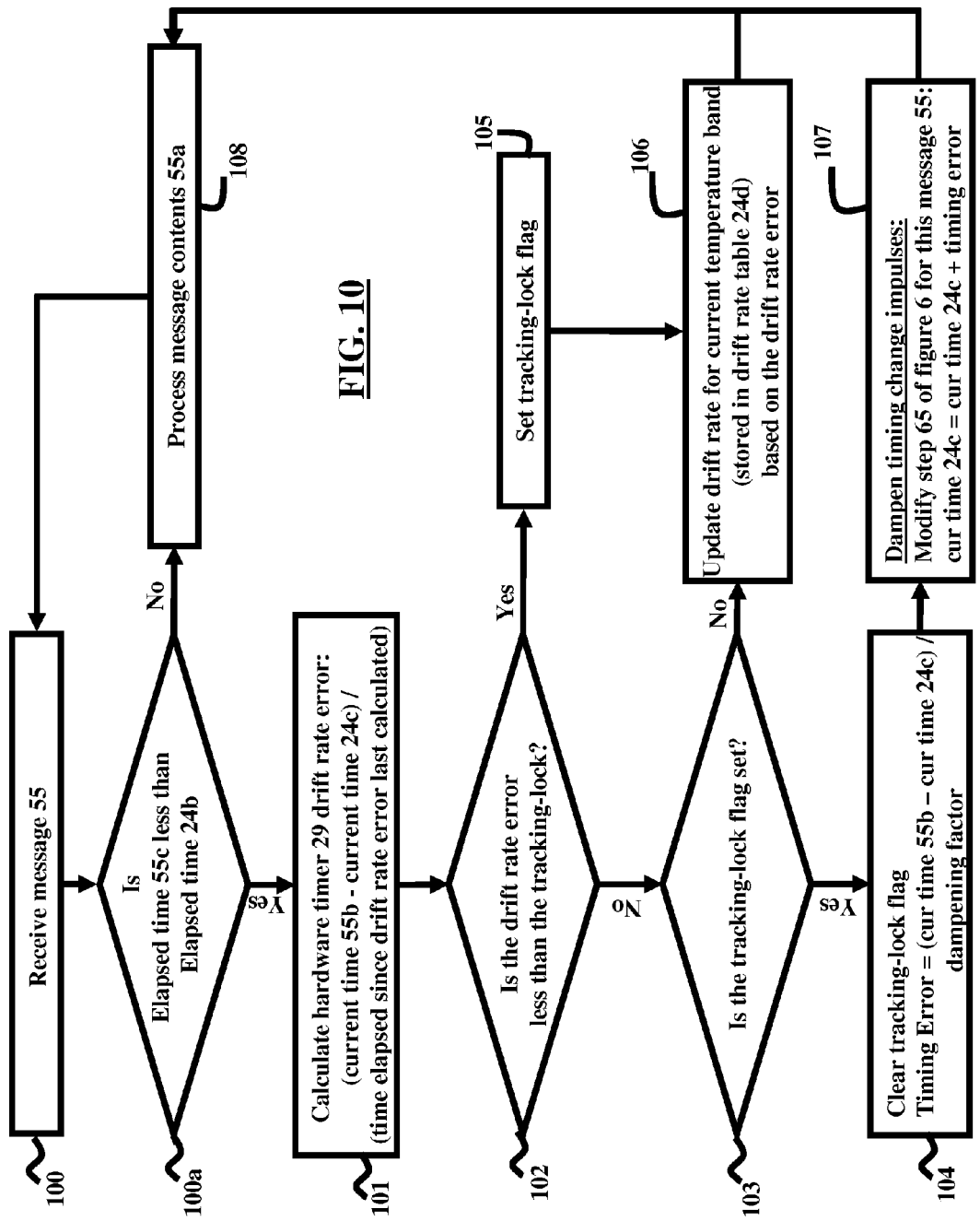
FIG. 10 is a flow diagram of one example of a closed loop control for maintaining synchronized timing and frequency between devices in a wireless mesh network during the time between reception of wireless communications, according to embodiments described herein.

FIG. 10, with reference to FIGS. 1 through 9, illustrates a flow diagram of a closed-loop control method for dynamically determining and compensating for the drift of an oscillator (e.g., LFXO hardware timer 29) relative to a remote oscillator (e.g., hardware timer 14) with higher stability for a given temperature or range of temperatures. FIG. 10 also illustrates measuring and adjusting the drift rate for a detected temperature band, according to embodiments described herein. As shown in step 100, the method illustrated in FIG. 10 receives a wireless message 55 from a gateway device 10 or remote device 20. In step 100a, the remote device 20 compares the received elapsed time 55c with the stored elapsed time 24b. If the received elapsed time 55c is less than the stored elapsed time 24b, the received current time 55b is considered more accurate than the stored current time 24c and remote device 20 receiving message 55 will synchronize its time with the time contained in message 55. In step 101, the receiving remote device 20 calculates the difference between the stored current time 24c as maintained by hardware timer 29 and the received current time 55b and calculates a drift rate error based on the calculated difference obtained in step 101 and the elapsed time since step 101 was last performed. Step 102 determines whether the calculated drift rate error is less than a "tracking-lock" value, where the tracking-lock value is optionally a predetermined numeric value that would indicate that the closed loop control is locked to the desired accuracy (e.g., 3 ppm). If the calculated drift rate error is less than the tracking-lock value, a tracking-lock flag is set in step 105 and the calculated drift rate error is used to adjust the drift rate for the measured temperature band stored in drift-rate table 24d in step 106 (e.g., 25% of the calculated drift rate error is added to the stored drift rate). However, if the calculated drift rate error is greater than or equal to the tracking-lock value, the method of FIG. 10 determines in step 103, whether the tracking-lock flag has been set in step 105 of a previous iteration of the algorithm. If the tracking-lock flag has been set, step 104 resets (clears) the tracking-lock flag and dampens (reduces) the adjustment that will be made to current time 24c and elapsed time 24b in step 65 of FIG. 6; the drift rate in the drift-rate table 24d is not adjusted to prevent impulse timing errors as illustrated in step 107. The damping shown in step 104 helps reduce the slew effect of a potentially erroneous impulse timing change to only a few transmissions, reducing the magnitude of the change with each transmission while not letting the devices drift too far apart. Upon determining the tracking-lock has not been set in step 103, the method of FIG. 10 applies the calculated drift rate error from step 101 to the stored drift rate in the drift rate table 24d for the measured temperature band as illustrated in step 106 (e.g., 25% of the calculated drift rate error is added to the stored drift rate). Upon completion of steps 106 or 107, the contents of message 55 are processed in step 108.

Thus, for each hardware timer 29 in remote device 20 in wireless network 1 and each temperature band, an independent control loop (as described in FIG. 10) optionally tracks the drift rate of the device's LFXO relative to a master (e.g., hardware timer 14 in gateway device 10) timing reference based on the wireless messages 55 received from other devices as described above. The drift rate is used to compensate for hardware timer drift (timing error) between synchronizing wireless messages 55 by periodically adjusting the current time 24c and elapsed time 24b to maintain synchronization of frame 40, super frame 45, and slot 50 between devices.

The high levels of timing accuracy developed by the closed loops 45, chronized timers may also be used to accurately measure the frequency of other oscillators such as a radio frequency oscillator with high accuracy as described above. For example, a radio-frequency crystal oscillator (RFXO) is commonly used to derive the transmit and receive frequency channels used by a transceiver. An RFXO might oscillate at a frequency of 39 MHz; a phase-locked loop ("PLL") might be used to generate a higher frequency based on the RFXO oscillations and a divider circuit might be use to generate a lower frequency based on the RFXO. For example, an RFXO oscillating at 39 MHz might use a PLL multiplier to generate a frequency of 915 MHz for radio transmission and also might use a divider circuit to generate a frequency of 1.22 MHz to control a microprocessor or other circuit. The accuracy of both the higher and lower frequencies depends on the accuracy of the 39 MHz RFXO; if the RFXO is oscillating too quickly, the generated higher and lower frequencies will also be too high. A device containing an RFXO and either a high-accuracy timer (e.g., master timer 14) or a timer (e.g., hardware timer 29) that is synchronized with a high-accuracy timer using the methods described above, may use the synchronized or high-accuracy timer to measure and calibrate the RFXO using the methods described above for determining and compensating for a fixed (e.g., manufacturing) offset. Moreover, these methods may be applied across multiple temperature bands to allow a device to compensate for temperature-induced frequency errors in multiple timers/oscillators provided at least one timer/oscillator has been synchronized to a high-accuracy source using the methods described above. This might, for example, allow a remote device containing a hardware timer (e.g., hardware timer 29) that has been synchronized with a high accuracy remote hardware timer (e.g., TCXO hardware timer 14) to also synchronize its RFXO and therefore its radio frequency channels with the same degree of accuracy.

In addition to the embodiments discussed above, the method described herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of a hardware embodiment and software embodiment. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 11. This schematic drawing illustrates a hardware configuration of an information handling/computer system in accordance with the embodiments herein. The system comprises at least one processor or central processing unit (CPU) 10. The CPUs 110 are interconnected via system bus 112 to various devices such as a random access memory (RAM) 114, read-only memory (ROM) 116, and an input/output (I/O) adapter 118. The I/O adapter 118 can connect to peripheral devices, such as disk units 111 and tape drives 113, or other program storage devices that are readable by the system. The system can read the inventive instructions on the program storage devices and follow these instructions to execute the methodology of the embodiments herein. The system further includes a user interface adapter 119 that connects a keyboard 115, mouse 117, speaker 124, microphone 122, and/or other user interface devices such as a touch screen device (not shown) to the bus 1112 to gather user input. Additionally, a communication adapter 120 connects the bus 112 to a data processing network 125, and a display adapter 121 connects the bus 112 to a display device 123 which may be embodied as an output device such as a monitor, printer, or transmitter, for example.

The embodiments herein provide a technique for synchronizing the timing among remote devices in a wireless mesh network 1 wherein a plurality of remote devices 20 use wireless messaging and various other methods to maintain timing synchronization required for communication. The embodiments herein allow for synchronizing of the timing of a plurality of geographically diverse devices 20 in a TDMA wireless mesh network 1 while communicating infrequently in order to conserve power. The embodiments herein may be utilized in various applications including, but not limited to wireless sensor networks (WSN), utility automatic meter reading (AMR), agricultural monitoring and control, industrial equipment monitoring and control, traffic management, and advertising and schedule distribution systems.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system of coordinating communication across a wireless network comprising a plurality of electronic devices operatively connected to said wireless network, each electronic device of said plurality of electronic devices comprising:
   a wireless transceiver transmitting and receiving messages;
   a central processing unit coupled and operatively in communication with said wireless transceiver;
   a memory unit coupled and operatively in communication with said central processing unit; and
   a timer coupled and operatively in communication with said central processing unit, said timer comprising an oscillator measuring an amount of elapsed time;
   wherein a first electronic device of said electronic devices periodically transmits a master timing message comprising a current time as measured and maintained by a first timer,
   wherein upon receiving said master timing message, a second electronic device of said electronic devices stores said received current time as synchronization time in a second memory unit and synchronizes a second timer with said received current time,
   wherein said second electronic device transmits a synchronized timing message comprising said stored synchronization time, and a second current time, as determined by said second timer,
      wherein upon receiving said synchronized timing message, a third electronic device of said electronic devices compares said received synchronization time with a third synchronization time stored in a third memory unit and replaces said stored third synchronization time with said received synchronization time and synchronizes a third timer with said received current time only when said received synchronization time is newer than said stored third synchronization time.

2. The system of claim 1,
wherein a fourth electronic device of said plurality of electronic devices, upon receiving a first message comprising at least one of a synchronized timing message containing a newer synchronization time and a master timing message, and subsequently receiving a second message comprising at least one of a synchronized timing message comprising a newer synchronization time and a master timing message, said fourth electronic device calculates an elapsed time as being the time elapsed between receiving the first message and the second message,
wherein said fourth electronic device calculates a timing error as being a difference between the current time in said received second message and the current time as maintained by a fourth timer prior to synchronization with the current time in said second message,
wherein said fourth electronic device calculates a timer drift rate as being a ratio of said timing error divided by said elapsed time and stores said drift rate in a fourth memory unit, and
wherein said fourth electronic device periodically adjusts said fourth timer by advancing or retracting said fourth timer by an amount equal to said stored drift rate multiplied by the time elapsed since said fourth timer was last adjusted or synchronized.

3. The system of claim 2, wherein said fourth electronic device stores a drift rate threshold and a lock switch in said memory unit and when said calculated drift rate is less than said drift rate threshold, said fourth electronic device sets said lock switch in said memory unit and applies said calculated drift rate towards adjustment of said fourth timer, otherwise when said calculated drift rate is at least as great as said drift rate threshold, said fourth electronic device resets said lock switch in said memory unit and applies a fraction of said calculated drift rate to the adjustment of said fourth timer.

4. The system of claim 2, wherein a fifth electronic device of said electronic devices further comprises a temperature sensor coupled and operatively in communication with said central processing unit, said temperature sensor measuring an ambient temperature, and
wherein said fifth electronic device periodically retrieves a temperature drift rate, corresponding to said ambient temperature as measured by said temperature sensor, from a drift rate table stored in a fifth memory unit and advances or retards said timer by said temperature drift rate.

5. The system of claim 4,
wherein said drift rate table comprises initial values and said initial values are calculated using at least one of a heuristic value, said ambient temperature measurement, and a difference between a first frequency and a second frequency, and
wherein said heuristic value comprises a predetermined drift rate calculation of said timer at said ambient temperature measurement.

6. The system of claim 4, wherein said temperature drift rate stored in said memory is periodically updated by replacing an existing value with a new value calculated as a function of said stored temperature drift rate and said calculated timer drift rate.

7. The system of claim 2, wherein said second electronic device further comprises:
an auxiliary oscillator,
wherein when said adjusted drift rate of said second device synchronized hardware timer is determined to be less than a drift tolerance of said auxiliary oscillator, a measured frequency of said auxiliary oscillator is measured by comparing said frequency of said auxiliary oscillator with said second device synchronized hardware timer, and
wherein any difference between a nominal and said measured frequency of said auxiliary oscillator is corrected by adjusting or retracting said auxiliary oscillator by an appropriate amount as to compensate for said measured difference.

8. The system of claim 7, wherein said auxiliary oscillator comprises a radio frequency oscillator and said radio frequency oscillator generates a radio frequency signal.

9. The system of claim 1, wherein a fifth electronic device of said plurality of electronic devices further comprises an accuracy timer coupled and operatively in communication with said central processing unit, said accuracy timer comprising an accuracy oscillator measuring an accuracy elapsed time.

10. The system of claim 9, wherein said fifth electronic device calculates a drift rate of a fifth timer relative to said accuracy timer and stores said drift rate as an estimated drift rate in a fifth memory unit.

11. The system of claim 10, wherein said fifth electronic device periodically advances or retards said fifth timer to compensate for said drift rate stored in said fifth memory unit.

12. A system for synchronizing time amongst a plurality of wireless network devices in a wireless network where a message is exchanged between a transmitting wireless device and a receiving wireless device, said system comprising:
a controller that inserts synchronized time information in said message, prior to transmitting said message, said synchronized time information comprising a current time value and a synchronization time value;
a processor that determines a local elapsed time value since last receiving a last synchronized time; and
at least one remote device comprising a temperature sensor measuring an ambient temperature, wherein said at least one remote device periodically retrieves a temperature drift rate corresponding to said ambient temperature measured by said temperature sensor.

13. The system of claim 12, further comprising:
a gateway device comprising:
a gateway receiver;
a gateway transmitter that transmits said message that includes gateway time synchronization information;
a gateway hardware timer comprising an oscillator;
a gateway central processing unit coupled and operatively in communication with said gateway receiver, said gateway transmitter, and said gateway hardware timer; and
a gateway memory unit coupled and operatively in communication with said gateway central processing unit, said gateway memory unit comprising a drift rate table;
at least one remote device comprises:
a remote receiver that receives time synchronization information that includes a current time value and a synchronization time value;
a remote transmitter that transmits time synchronization information;
a remote hardware timer comprising an oscillator;
a remote micro-controller coupled and operatively in communication with said remote receiver, said remote transmitter, and said remote hardware timer; and a remote memory unit coupled and operatively in communication with said remote micro-controller, wherein said remote memory unit comprises:
- a current time value;
- a synchronization time value; and
- a drift rate value.

14. The system of claim 13, wherein said remote device updates said remote hardware timer with said received current time and replaces said stored synchronization time with said received synchronization time when said received synchronization time is newer than said stored synchronization time value.

15. The system of claim 13, wherein said remote device further comprises a memory manager that stores a difference between a nominal frequency value and a measured actual frequency value of said remote hardware timer, and wherein said remote micro-controller of said remote device accumulates said difference between said nominal frequency value and said actual frequency value for a cycle of said remote hardware timer and compares said accumulated difference until said accumulated difference exceeds an approximated time of transmitting one bit of information, wherein:
    when said accumulated difference is as least as great as said approximated time of transmitting one bit of information, adjusting said remote hardware timer to compensate for said difference; otherwise,
    waiting until next cycle of said remote hardware timer.

16. The system of claim 13, wherein said temperature drift rate is retrieved from a drift rate table stored in said remote memory unit, and wherein said remote device advances or retards said timer according to said temperature drift rate.

17. The system of claim 13,
    wherein a second electronic device of said at least one remote device synchronizes a second timer with said current time received in said master timing message and subsequently transmits a synchronized timing message containing a second device current time as measured and maintained by said remote hardware timer,
    wherein upon receiving said synchronized timing message with a newer synchronization time or receiving said master timing message, a third electronic device of said at least one remote device calculates a timing error as being a difference between said received current time and said current time maintained by third electronic device remote hardware timer,
    wherein said third electronic device calculates a drift rate as a ratio of said timing error divided by an elapsed time that has elapsed since said third electronic device remote hardware timer was last synchronized according to said synchronized timing message, and
    wherein said third electronic device periodically adjusts said third electronic device remote hardware timer by advancing or retracting said third electronic device remote hardware timer by an amount equal to said drift rate multiplied by said elapsed time since the last adjustment.

18. The system of claim 17,
    wherein said drift rate table comprises initial values and said initial values are calculated using at least one of a heuristic value, said ambient temperature measurement, and a difference between a first frequency and a second frequency, and
    wherein said heuristic value comprises a predetermined drift rate calculation of said timer at said ambient temperature measurement.

19. The system of claim 17, wherein said temperature drift rate stored in said remote memory unit is periodically updated by replacing the initialized value with a new value calculated as a function of said temperature drift rate and a timer drift rate.

20. The system of claim 13, further comprising a radio frequency (RF) oscillator,
    wherein said radio frequency oscillator generates a radio frequency signal,
    wherein an adjusted drift rate of a synchronized hardware timer is determined to be less than a drift tolerance of said RF oscillator, a measured frequency of said RF oscillator is measured by comparing said frequency of said RF oscillator with said synchronized hardware timer, and
    wherein any difference between a nominal and said measured frequency of said RF oscillator is corrected by adjusting or retracting said RF oscillator by an appropriate amount as to compensate for said measured difference.

* * * * *